US008246441B2

(12) United States Patent
Bleich et al.

(10) Patent No.: US 8,246,441 B2
(45) Date of Patent: Aug. 21, 2012

(54) GAMING MACHINE HAVING POSITION SENSOR FOR MECHANICAL REEL MODULARITY

(75) Inventors: Charles R. Bleich, Cary, IL (US); Bruce H. Blair, Oak Park, IL (US); Anticio T. Duke, Chicago, IL (US); James P. Krol, Palos Hills, IL (US); Eric T. Miner, Chicago, IL (US); James M. Rasmussen, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 498 days.

(21) Appl. No.: 12/581,282

(22) Filed: Oct. 19, 2009

(65) Prior Publication Data

US 2010/0099483 A1 Apr. 22, 2010

Related U.S. Application Data

(60) Provisional application No. 61/107,585, filed on Oct. 22, 2008.

(51) Int. Cl.
*A63F 9/24* (2006.01)
*A63F 13/00* (2006.01)

(52) U.S. Cl. ................ 463/20; 463/16; 463/17; 463/18; 463/19; 463/22; 463/30; 463/31; 463/34; 362/213

(58) Field of Classification Search ............. 463/16–20, 463/22, 30–31, 34; 362/213
See application file for complete search history.

(56) References Cited

U.S. PATENT DOCUMENTS

| | | | | |
|---|---|---|---|---|
| 5,058,893 | A | 10/1991 | Dickinson et al. | |
| 5,388,829 | A * | 2/1995 | Holmes | 273/143 R |
| 5,580,055 | A * | 12/1996 | Hagiwara | 273/143 R |
| 5,683,296 | A * | 11/1997 | Rasmussen | 463/20 |
| 5,722,891 | A | 3/1998 | Inoue | |
| 5,938,529 | A | 8/1999 | Rodesch et al. | |
| 6,126,165 | A | 10/2000 | Sakamoto | |
| 6,206,781 | B1 | 3/2001 | Sunaga et al. | |
| 6,517,479 | B1 | 2/2003 | Sekiya et al. | |
| 2005/0277460 | A1* | 12/2005 | Inoue | 463/20 |
| 2008/0096655 | A1 | 4/2008 | Rasmussen et al. | |
| 2008/0207303 | A1 | 8/2008 | Rasmussen | |
| 2009/0203420 | A1* | 8/2009 | Yoshizawa | 463/20 |

FOREIGN PATENT DOCUMENTS

EP 1772311 A1 4/2007

* cited by examiner

*Primary Examiner* — Peter DungBa Vo
*Assistant Examiner* — Jasson Yoo
(74) *Attorney, Agent, or Firm* — Nixon Peabody LLP

(57) ABSTRACT

A gaming system for conducting a wagering game includes a display, a reel mounted for rotation relative to the display, the reel having a plurality of display symbols thereon, a plurality of light cups stationary relative to the display for illuminating symbols on the reel in the direction of the display, a sensor to detect the position of the light cups relative to the display and generate position information, and a controller in communication with the sensor operative to receive the position information from the sensor and determine the position of the light cups relative to the reel from the position information.

25 Claims, 19 Drawing Sheets

GAMING MACHINE HAVING POSITION SENSOR FOR MECHANICAL REEL MODULARITY

CLAIM OF PRIORITY AND CROSS-REFERENCE TO RELATED APPLICATION

This application claims the benefit of U.S. Provisional Application No. 61/107,585, filed Oct. 22, 2008, which is incorporated herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus, and more particularly, to configuring a wagering game apparatus.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

An example of a slot machine includes a plurality of mechanical reels, each mechanical reel being mounted on a reel support structure and rotated by a motor. The reel rotates a reel strip past a display area. The reel strip is transparent or translucent, and includes a plurality of symbols. The symbols are illuminated from behind (relative to the display) by lights that are contained in light cups. The light cups direct light in the direction of the display, such that the illuminated symbols are displayed in or through the display.

SUMMARY OF THE INVENTION

According to one aspect of the present invention, a gaming system for conducting a wagering game includes a reel mounted for rotation relative to the display, the reel comprising a reel strip having a plurality of display symbols thereon. A plurality of light cups are provided and are configured to illuminate the symbols on the reel strip that are displayed on the display. A sensor is configured to detect a position of the light cups relative to the display and to output position information and a controller is configured to receive the position information from the sensor and to determine the position of the light cups relative to the reel from the position information.

According to another aspect of the present invention, a gaming system for conducting a wagering game includes a plurality of light cups associated with a rotating reel to illuminate symbols on the reel, a sensor to detect the position of the plurality of light cups relative to a display, an adjustment device connected to the plurality of light cups to change the position of the plurality of light cups relative to the display, and a controller. The controller is configured to receive position information from the sensor, compare the position information to a predetermined position parameter, and control the adjustment device to change the position of the light cups until the position information matches the predetermined position parameter.

According to another aspect of the invention, a method of configuring a wagering game on a gaming system includes detecting with a first sensor a position of a first plurality of light cups associated with a first rotatable reel, generating first position information at the first sensor indicative of the position of the first plurality of light cups, receiving the first position information at a controller, and comparing the first position information to a first predetermined value, and generating a signal indicating that the first position information matches or mismatches the first predetermined value.

Another aspect of the invention is a method of configuring a wagering game on a gaming system including at least one mechanical reel, the mechanical reel being illuminated by a light cup The method includes providing a plurality of game mode options including a first game mode and a second game mode. The first game mode requires a first light cup position for the light cup relative to a mechanical reel and the second game mode requires a second light cup position for the light cup relative to a mechanical reel, and second position is different than the first position. The method also includes selecting one of the first game mode or the second game mode, sensing the position of the light cup relative to the mechanical reel, comparing the position of the light cup to the required position for the selected game mode, and moving the position of the light cup relative to the mechanical reel when the position of the light cup does not correspond to a selected game mode. The act of moving includes moving the light cup from the first light cup position to the second light cup position when the second game mode is selected and moving the light cup from the second light cup position to the first light cup position when the first game mode is selected.

According to yet another aspect of the present invention, a gaming system for conducting a wagering game includes a plurality of light cups associated with a first rotatable reel, the reel including a plurality of symbols. The gaming system also includes sensing means to determine position information of the plurality of light cups and a controller in communication with the sensing means operative to determine the position of the plurality of light cups from the position information.

According to still another aspect of the present invention, a gaming system for conducting a wagering game includes an array of light sources, a plurality of partitions for dividing the array of light sources into groups, position sensors to detect the positions of the plurality of partitions, and a controller configured to receive position information from the position sensors, determine the positions of the plurality of partitions, and selectively illuminate the light sources corresponding to the groups.

According to another aspect of the present invention, a gaming system for conducting a wagering game includes an array of light sources, means for directing light from the light sources through a display, and means for selectively illuminating groupings of light sources of the light source array to correspond to a symbol configuration.

In another aspect of the present invention, there is provided means for illuminating reel symbols displayed on a display using light sources, sensor means for sensing a position of the light sources relative to the display and outputting a signal relating to the sensed position of the light sources, and processing means for receiving the signal from the sensor means and for determining a position of the light sources relative to the display.

Additional aspects of the invention will be apparent to those of ordinary skill in the art in view of the detailed description of various embodiments, which is made with reference to the drawings, a brief description of which is provided below.

Figure 1A:
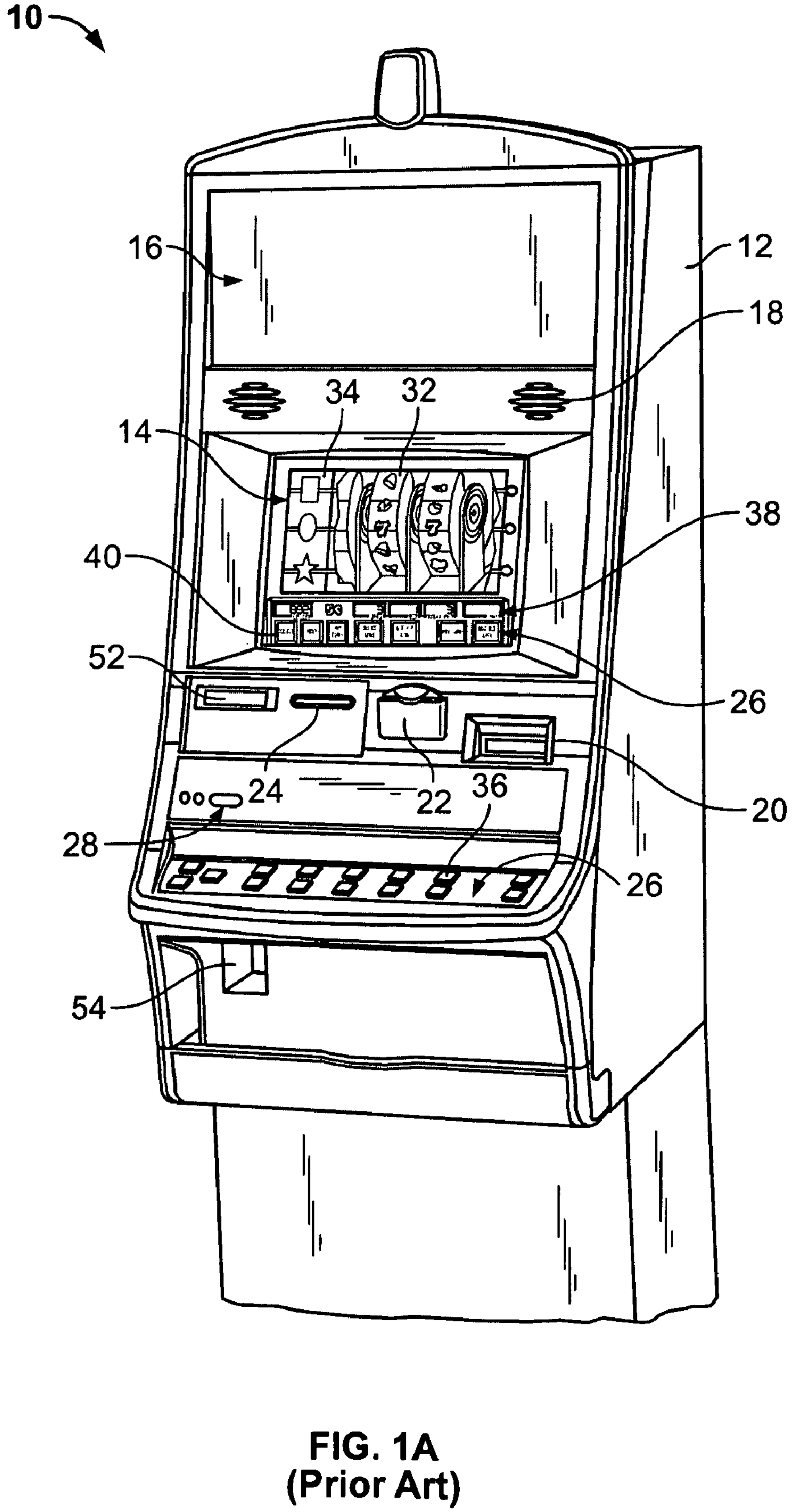
FIG. 1A (Prior Art)
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may have varying structures and methods of operation. For example, the gaming terminal 10 may be an electromechanical gaming terminal configured to play mechanical slots. It should be understood that although the gaming terminal 10 is shown as a free-standing terminal of the upright type, it may take on a wide variety of other forms such as a free-standing terminal of the slant-top type.

The illustrated gaming terminal 10 comprises a cabinet or housing 12. For output devices, the gaming terminal 10 may include a primary display area 14, a secondary display area 16, and one or more audio speakers 18. The primary display area 14 and/or secondary display area 16 may display information associated with wagering games, non-wagering games, community games, progressives, advertisements, services, premium entertainment, text messaging, emails, alerts or announcements, broadcast information, subscription information, etc. For input devices, the gaming terminal 10 may include a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements may exist and may be used in any number of combinations to create various forms of a gaming terminal.

The primary display area 14 may include a mechanical-reel display, a video display, or a combination thereof in which a transmissive video display in front of the mechanical-reel display portrays a video image superimposed over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display may include a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10. The primary display area 14 may include one or more paylines 30 (see FIG. 3) extending along a portion thereof. In the illustrated embodiment, the primary display area 14 comprises a plurality of mechanical reels 32 and a video display 34 such as a transmissive display (or a reflected image arrangement in other embodiments) in front of the mechanical reels 32. If the wagering game conducted via the gaming terminal 10 relies upon the mechanical reels 32 but not the video display 34, the video display 34 may be replaced with a conventional glass panel.

Video images in the primary display area 14 and/or the secondary display area 16 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, or a high-definition (HD) digital format.

The player-input devices 26 may include a plurality of buttons 36 on a button panel and/or a touch screen 38 mounted over the primary display area 14 and/or the secondary display area 16 and having one or more soft touch keys 40. The player-input devices 26 may further comprise technologies that do not rely upon touching the gaming terminal, such as speech-recognition technology, gesture-sensing technology, eye-tracking technology, etc.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed in U.S. Patent Publication No. 2003/0045354 entitled "Portable Data Unit for Communicating With Gaming Machine Over Wireless Link," which is incorporated herein by reference in its entirety. The account may be stored at an external system 46 (see FIG. 2) as more fully disclosed in U.S. Pat. No. 6,280,328 to Holch et al. entitled "Cashless Computerized Video Game System and Method," which is incorporated herein by referenced in its entirety, or directly on the portable medium. To enhance security, the individual carrying the portable medium may be required to enter a secondary independent authenticator (e.g., password, PIN number, biometric, etc.) to access their account.

The terminal can also include a seat. For example, the seat can include a reinforced inflatable air bladder system that can apply different amounts of pressure to different portions of the seat cushion or seat back. For example, the inflatable air bladder system could include an array of inflatable chambers, where the pressure in the chambers could be independently adjusted. The pressure can be controllable, for example in response to sensors in the seat. For example, the pressure can be controlled as a function of the weight of the person sitting in the seat, the weight distribution on the seat, etc. The seat could also monitor the amount of time the person is seated in the seat and adjust the amount of pressure in the air bladder system as well as the pattern of pressure to the different portions of the seat back cushion or seat back. The pressure pattern can be designed to alleviate pain and discomfort associated with sitting in the seat for an extended period of time.

The pressure and pressure pattern could be customizable to a particular person, for example in response to information stored on a smart card or casino card. The inflatable bladder system could also be controlled to adjust the pressure and pressure pattern in coordination with a game being played on the gaming terminal. For example, the pressure pattern of the seat base and seat back could be adjusted to simulate motion, or otherwise contribute to an immersive experience.

Figure 2:
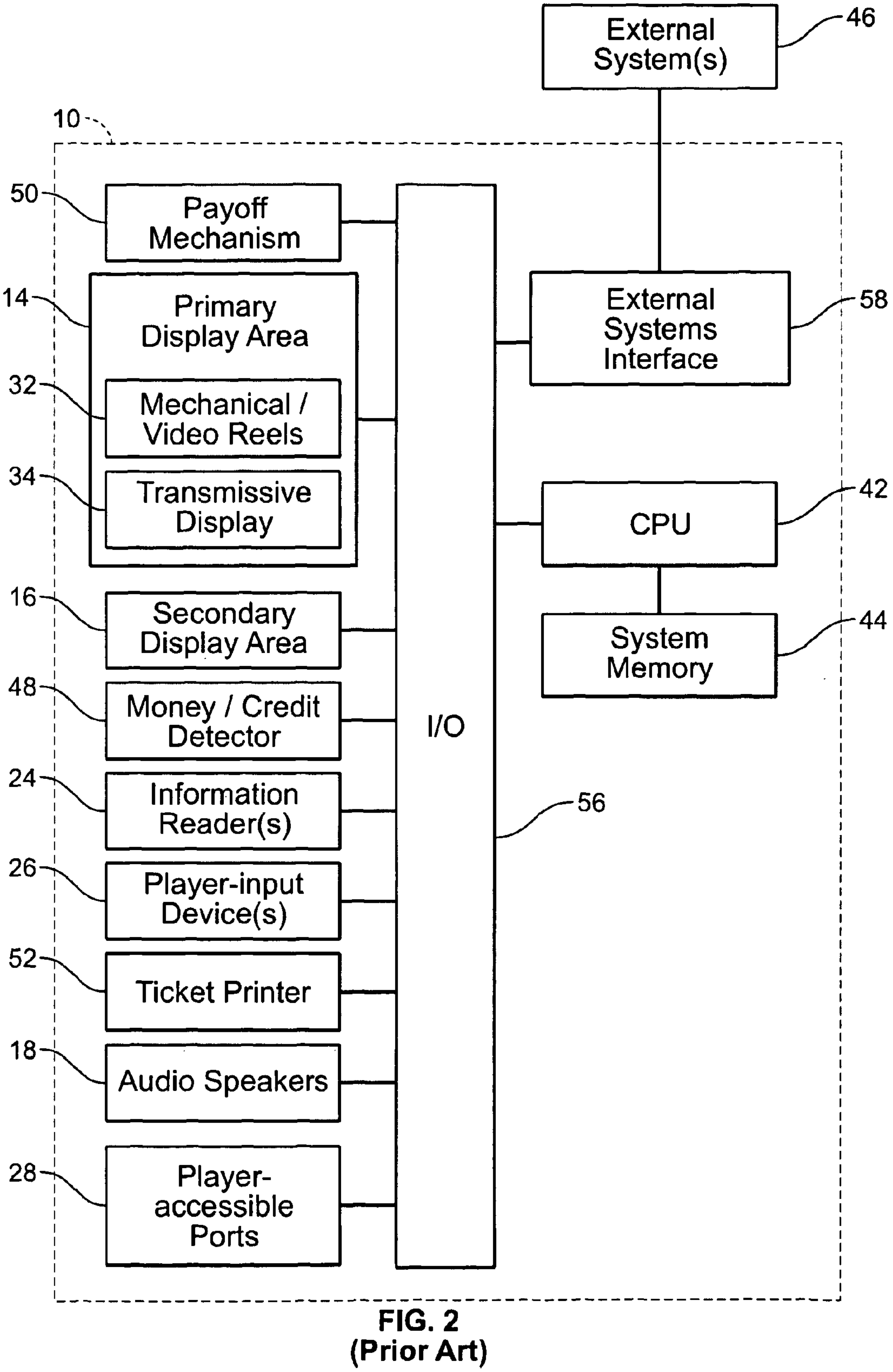
FIG. 2 (Prior Art)
FIG. 2 is a schematic view of a gaming system according to an embodiment of the present invention.

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device. The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and multiple program memories. The money/credit detector 48 signals the processor that money and/or credits have been input via a value-input device, such as the bill validator 20, coin acceptor 22, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, and a payoff mechanism 50. The payoff mechanism 50 is operable in response to instructions from the controller 42 to award a payoff to the player in response to certain winning outcomes that might occur in the base game, the bonus game(s), or via an external game or event. The payoff may be provided in the form of money, redeemable points, services or any combination thereof. Such payoff may be associated with a ticket (from a ticket printer 52), portable data unit (e.g., a card), coins, currency bills, accounts, and the like. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface 58, which is connected to the external system 46. The controller 42 communicates with the external system 46 via the external system interface 58 and a communication path (e.g., serial, parallel, IR, RC, 10bT, etc.). The external system 46 may include a gaming network, other gaming terminals, a gaming server, a remote controller, communications hardware, or a variety of other interfaced systems or components.

Controller 42, as used herein, comprises any combination of hardware, software, and/or firmware that may be disposed or resident inside and/or outside of the gaming terminal 10 and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein.

The gaming terminal 10 may communicate with external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Figure 3:
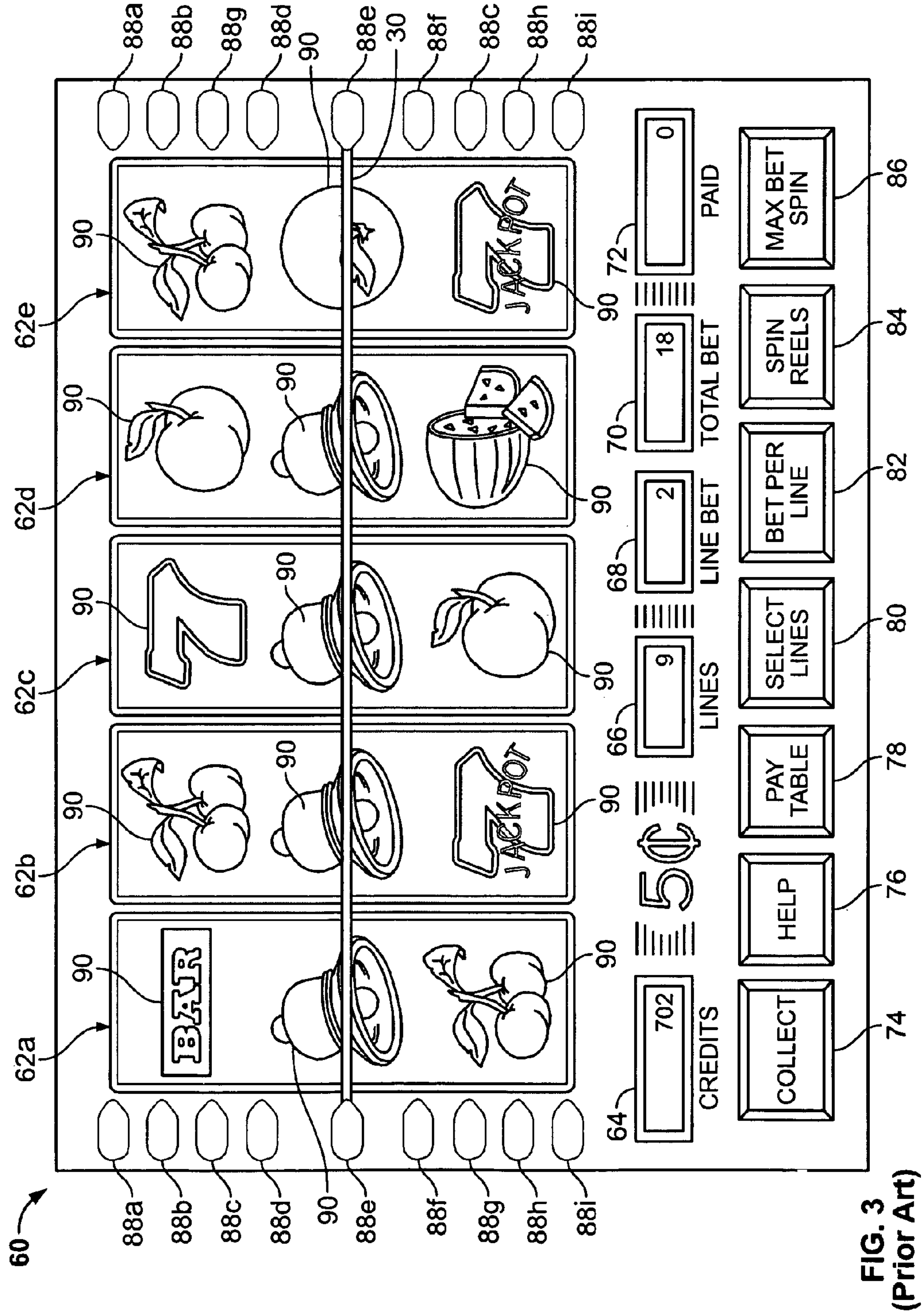
FIG. 3 (Prior Art)
FIG. 3 is an image of a basic-game screen of a wagering game that may be displayed on a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

The basic-game screen 60 may be displayed on the primary display area 14 or a portion thereof. In FIG. 3, the basic-game screen 60 portrays a plurality of mechanical reels 62*a-e*. The basic-game screen 60 may also display a plurality of game-session meters and various buttons adapted to be actuated by a player.

In the illustrated embodiment, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The user-selectable buttons may include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

Paylines 30 may extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations may be evaluated as line pays or scatter pays. Line pays may be evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with a single payline, or any plurality of paylines will also work with the present invention. Additionally, though an embodiment with five reels is shown, a gaming terminal with any plurality of reels may also be used in accordance with the present invention.

Figure 4:
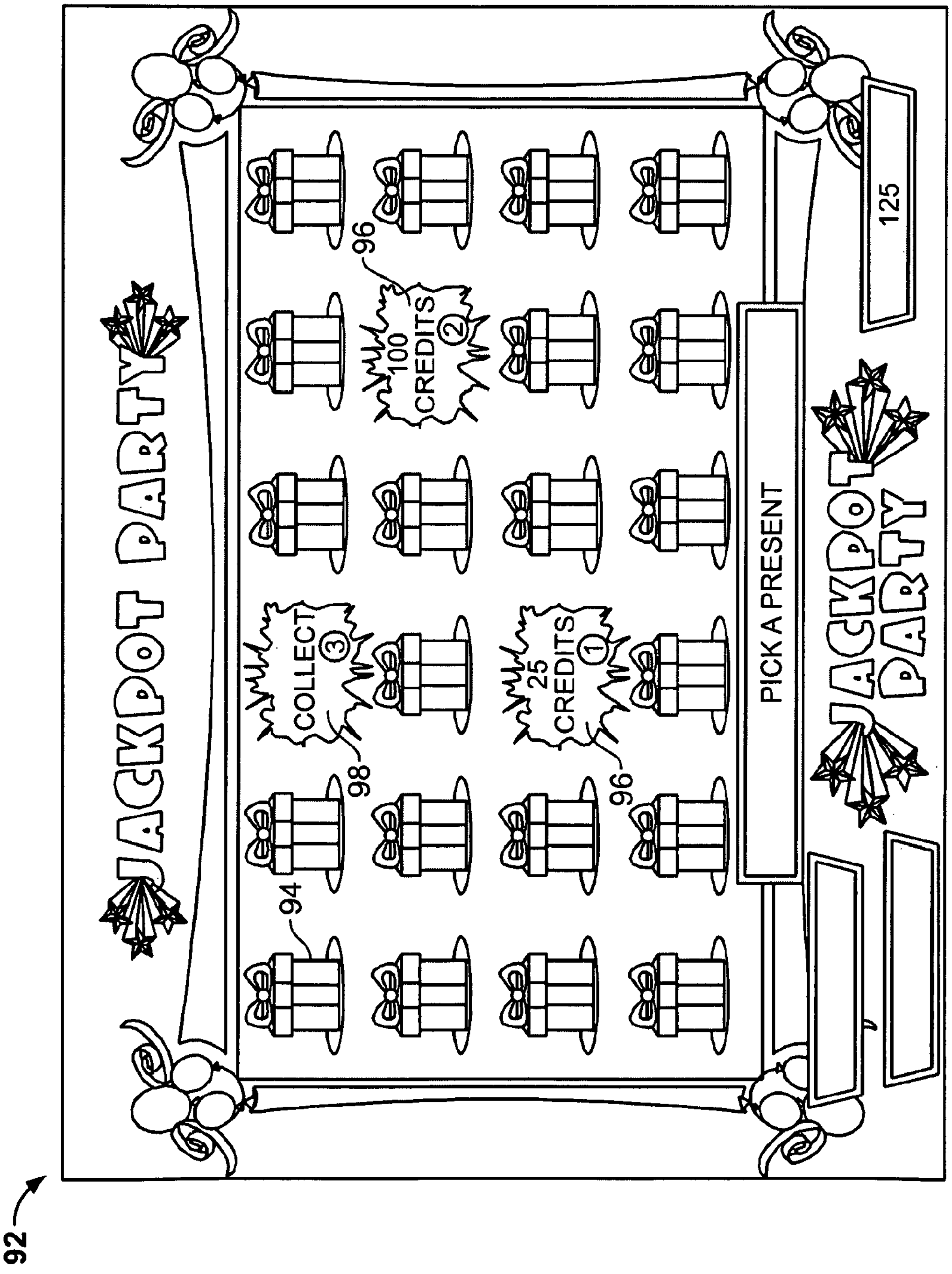
FIG. 4 (Prior Art)
FIG. 4 is an image of a bonus-game screen of a wagering game that may be displayed on a gaming terminal, according to an embodiment of the present invention.

Turning now to FIG. 4, a bonus game that may be included with a basic wagering game is illustrated, according to one embodiment. A bonus-game screen 92 includes an array of markers 94 located in a plurality of columns and rows. The bonus game may be entered upon the occurrence of a special start-bonus game outcome (e.g., symbol trigger, mystery trigger, time-based trigger, etc.) in or during the basic wagering game. Alternatively, the illustrated game may be a stand-alone wagering game.

In the illustrated bonus game, a player selects, one at a time, from the array of markers 94 to reveal an associated bonus-game outcome. According to one embodiment, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5:
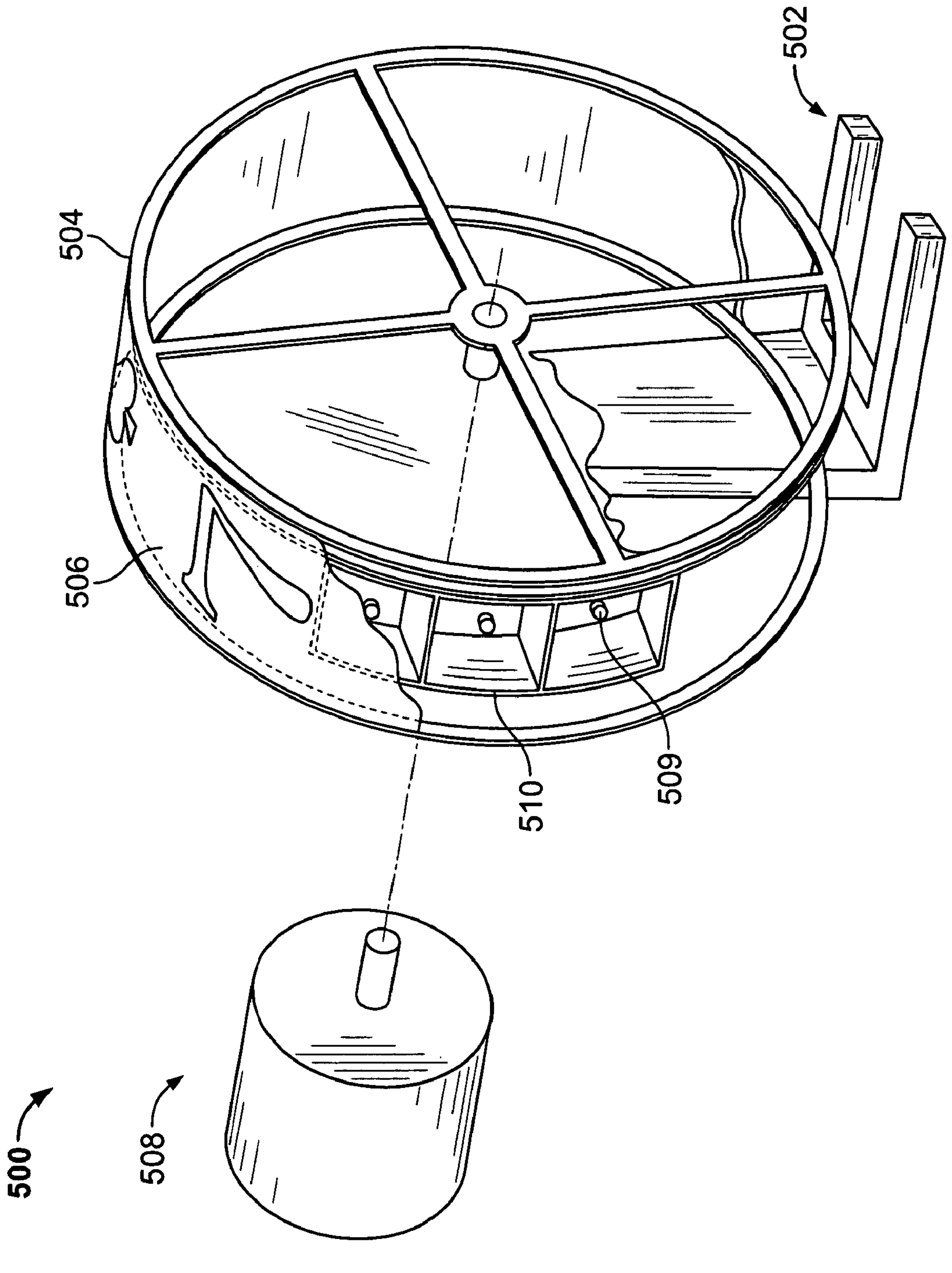
FIG. 5 is a perspective representation (not to scale) of a reel mechanism used in slot machines, according to an embodiment of the present invention.

Referring now to FIG. 5, there is shown an exaggerated perspective view of a typical reel mechanism 500 used in slot machines. A typical slot machine has three or more reel mechanisms disposed coaxially in side-by-side arrangement. The reel mechanism 500 consists generally of a reel support structure 502 and one or more reels 504 on which reel strips 506 are secured for rotation. The reel strip 506 can be, for example, a piece of plastic imprinted with the symbols for the particular game to be played. Rotation of each reel 504 is controlled by a motor 508, e.g., a stepper motor, connected to the reel 504 by an axle and/or one or more gears. The motors are operated by the appropriate driver circuitry under the control of the game CPU 42.

The reel mechanism 500 of FIG. 5 also includes a plurality of light cups 510 mounted to the reel support structure 502 or to the housing. The light cups 510 are held in a stationary position relative to the reel support structure 502 and primary display area 14, and illuminate the reel strip 506 from behind, such that as a symbol on the reel strip is rotated past a light cup, that symbol is illuminated and visible in or through the primary display area 14. The reel 504 preferably includes one light cup per symbol position on the reel, although a person of ordinary skill in the art would recognized that a plurality of light cups could be used for a single symbol position for the reel. A symbol position can be, for example, the position occupied by one symbol on the reel 504 displayed in the primary display area 14. For example, in FIG. 3, for the reel 62*a*, there are three symbol positions corresponding to the positions occupied by the three visible symbols.

The light cups 510 hold one or more lighting elements 509 each and direct light in the appropriate direction, such as through the reel strip 506 in the direction of the primary display area 14 so that each light cup illuminates a designated symbol position. The lighting elements 509 are preferably, but not necessarily, LEDs. For example, a light cup can hold six white LEDs and six RGB (color) LEDs. Alternatively, the lighting elements 509 can be incandescent light bulbs, organic light emitting diodes (OLED), cold cathode fluorescent lamps ("CCFL"), etc.

Figure 6A:
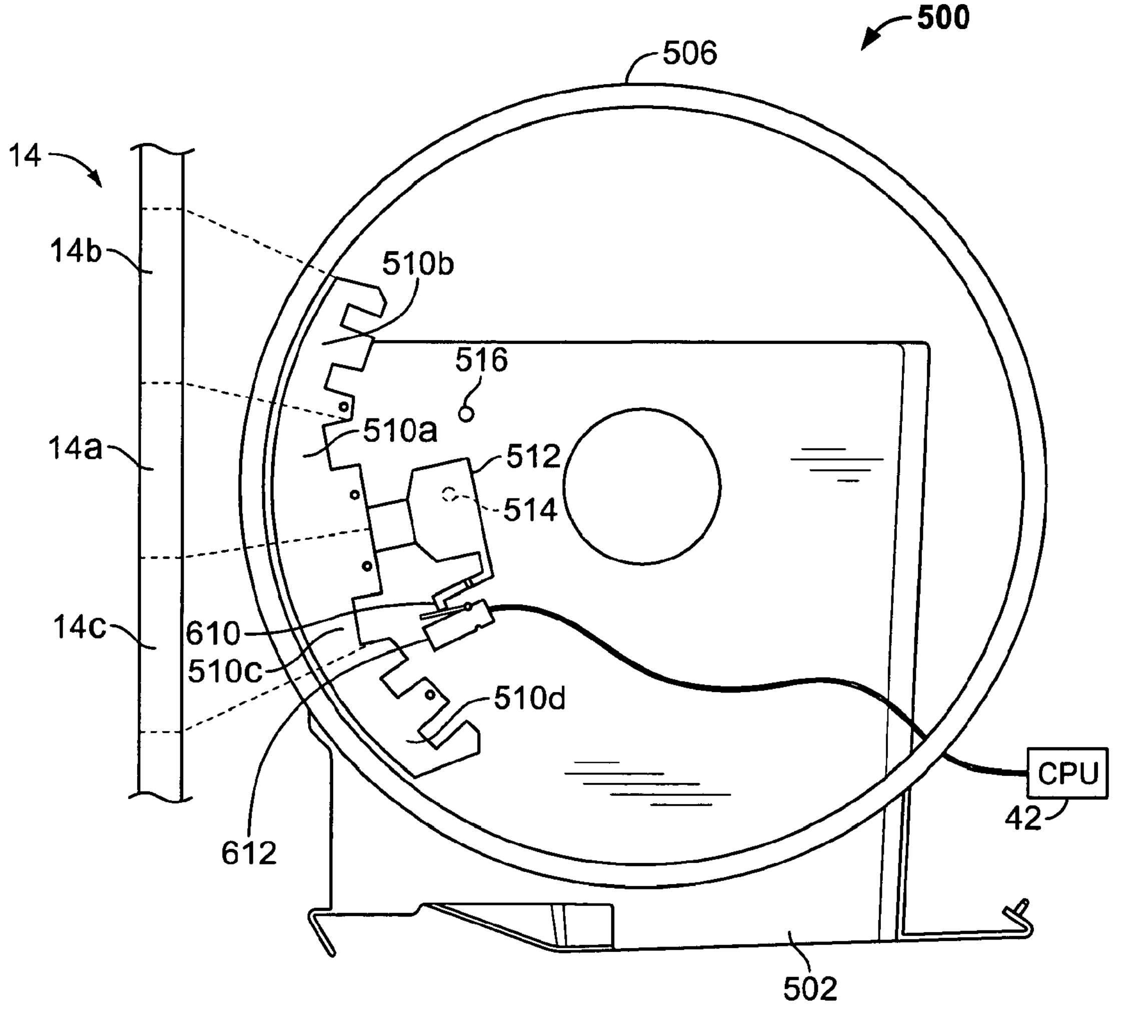
FIG. 6A is a side view (not to scale) of a reel mechanism, according to an embodiment of the present invention.

Referring now to FIG. 6A, there is shown a side view of the reel mechanism 500 with light cups 510*a*-510*d* positioned to correspond to a three symbol position configuration. This corresponds to, for example, three symbols being presented on the primary display area 14 for each reel. In FIG. 6A, light cups 510*a*, 510*b*, and 510*c* are shown to illuminate the symbols on the reel strip 506 such that the reel symbols borne by the reel strip are illuminated or selectively illuminated at corresponding symbol positions 14*a*-14*c* of the primary display area 14, while light cup 510*d* is either occluded or electronically disabled and does not illuminate any symbol on the reel strip 506. In this example, primary display area 14 is sized to accommodate three symbol positions on each reel 504 corresponding to the position of light cups 510*a*, 510*b*, and 510*c*.

The reel mechanism 500 of FIG. 6A also includes a position indicator 610 to indicate whether or not the light cups are in a predetermined position with respect to the symbol positions 14*a*-14*c*. As shown in FIG. 6A, although the position indicator 610 is only configured in the depicted example to show a confirmation of a placement of the light cups in a predetermined position, other aspects of the present concepts include one or more sensors (e.g., rotary encoder) adapted to permit determination of a relative position of the light cups to the symbol positions 14*a*-14*c* or to other known reference points determined to illuminate appropriate ones of the symbol positions 14*a*-14*c*.

In the embodiment shown in FIG. 6A, the light cups 510*a*-510*d* are mounted to the reel support structure 502 through the use of a rotatable light cup mounting bracket 512. The light cup mounting bracket 512 is rotatably coupled to the reel support structure 502 about an axle to provide an axis of rotation (not shown). The light cup mounting bracket 512, once positioned in an appropriate operational position, is then fixed in place. In the example depicted in FIG. 6A, screws, bolts or pins (not shown) are used to secure the light cup mounting bracket 512 into the depicted three symbol position configuration and the screw, bolt or pin is fixed through holes in the reel support structure 502 (e.g., holes 514 and 516) and a corresponding hole in the light cup mounting bracket 512 (not shown), such that when the mounting bracket 512 is coupled by a screw, bolt or pin at hole 514 the light cups 510 are fixed into a first position. Further, the mounting bracket 512 may be positioned in another, second position wherein the is coupled by a screw, bolt or pin at hole 516, the light cups 510 are fixed into a second position. Other mechanisms could be used in accord with the present concepts to fix the mounting bracket 512 to the reel support structure. For example, the reel support structure could include a slot, and the mounting bracket 512 could be fixed to the reel support structure using a screw, bolt, or pin and corresponding mating component (e.g., washer, nut, pin, etc.) at a position in the slot corresponding to the first or the second position.

When the light cups 510 are in the three symbol position configuration, as shown in FIG. 6A, the light cups illuminate the reel strip 506 such that single symbols are illuminated at specific portions of the display 14. For example, in the three symbol position configuration, light cup 510*a* illuminates a symbol on the reel strip 506 such that the symbol displayed at position 14*a* of display 14 is illuminated, light cup 510*b* illuminates a symbol on the reel strip 506 such that the symbol displayed at position 14*b* of display 14 is illuminated and light cup 510*c* illuminates a symbol on the reel strip 506 such that the symbol displayed at position 14*c* of display 14 is illuminated. As previously noted, the illumination of the symbols may be selectively applied (e.g., to highlight a winning payline).

Figure 6B:
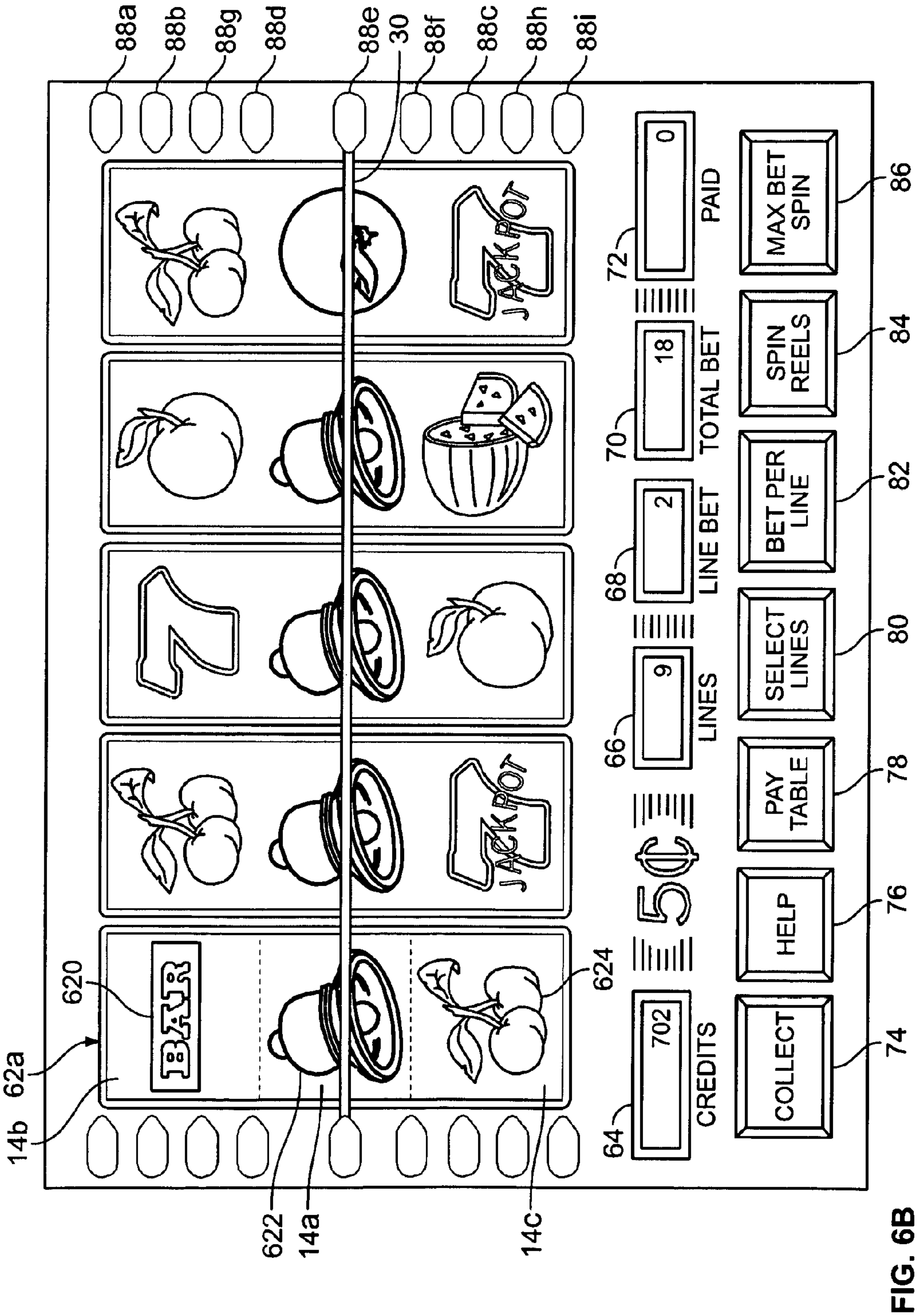
FIG. 6B is a depiction of a use of the light cups of FIG. 6A to selectively illuminate a winning payline in a winning game.

FIG. 6B illustrates the use of the light cups 510 to illuminate a reel strip 506. For reel 62*a*, in this example, a "bar" symbol 620 on the reel strip 506 is illuminated by light cup 510*b* and is visible at position 14*b* of the display; a "bell" symbol 622 is illuminated by light cup 510*a* and is visible at position 14*a* of the display; and a "cherry" symbol 624 is illuminated by light cup 510*c* and is visible at position 14*c* of the display. Each of the symbols could be illuminated to the same brightness, or the CPU 42 could configure the lighting elements of the light cups corresponding to a winning payline (here, the "bell" displayed at position 14*a*, as well as the other symbols of the other reels for that payline) to illuminate more brightly.

Referring back to FIG. 6A, the position indicator 610 is, in one embodiment, a protrusion on the light cup mounting bracket 512. Alternatively, the protrusion could be disposed on the back or sides of any of the light cups 510*a*-510*d*. The reel mechanism 500 also includes a switch 612 mounted to the reel support structure 502 and coupled to the CPU 42. Thus, the switch 612 is stationary relative to the reel support structure 502 and the protrusion 610, being attached to the light cup mounting bracket 512, is movable relative to the switch 612 until the light cup mounting bracket 512 is fixed to the reel support structure 502. When the light cups 510 are positioned in a three symbol position configuration, the protrusion 610 presses against the switch 612. While the switch 612 is pressed by the protrusion 610, the switch 612 outputs a signal to the CPU 42 indicating that the light cups 510*a-d* are properly positioned in a three symbol position configuration. In an alternate configuration, the switch mechanism 612 could be connected to the light cup mounting bracket 512 and the protrusion 610 could be connected to the reel support structure 502. Other types of position indicators may alternatively be used such as, but not limited to, an optical switch or magnetic switch to provide different mechanisms for actuating the switch than a protrusion pressing a mechanical switch (e.g., a magnetic switch includes a detector, for example mounted on the reel support structure, for detecting a magnetic field and a magnet placed, for example, on a light cup for detection by the magnetic detector).

Figure 7A:
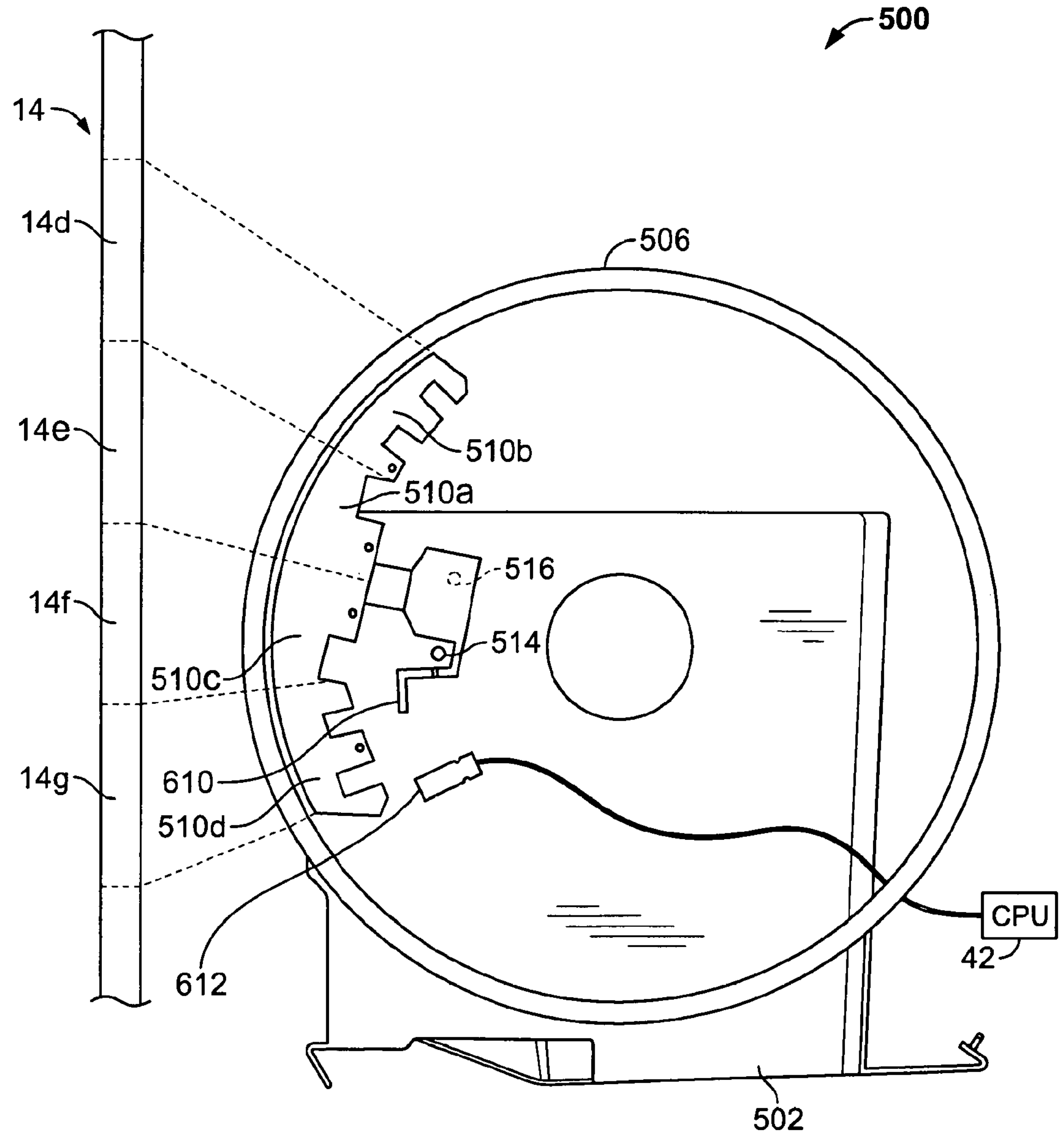
FIG. 7A is a side view (not to scale) of a reel mechanism, according to an embodiment of the present invention.

Referring now to FIG. 7A, there is shown a side view of the reel mechanism 500 in a four symbol position configuration. This corresponds to, for example, four symbols being presented on the primary display area 14 for the reel mechanism 500. In a four symbol position configuration, the primary display area 14 is sized to accommodate four symbol positions (displaying four symbols per reel), and each of light cups 510*a*, 510*b*, 510*c*, and 510*d* illuminate symbols in corresponding portions 14*d*-14*g* of the primary display area 14. The mounting bracket 512 is rotatably coupled to the reel support structure 502 about an axle to provide an axis of rotation (not shown). The light cup mounting bracket 512, once positioned in an appropriate operational position, is then fixed in place using a temporary fixing device. In the example depicted in FIG. 7A, screws, bolts or pins (not shown) are used to secure the light cup mounting bracket 512 into the depicted four symbol position configuration and the screw, bolt, or pin is fixed by inserting the screw, bolt or pin through hole 516 and a corresponding hole in the light cup mounting bracket 512 (not shown) and affixing the screw, bolt or pin in place using a corresponding mating component (e.g., washer, nut, pin, etc.), thus fixing the light cups 510 in a second position. In the four symbol position configuration, the protrusion 610 on the light cup mounting bracket 512 does not engage the switch 612, and the switch mechanism 612 does not send a signal to the CPU 42. This indicates that the light cup mounting bracket 512 is in the four symbol position configuration. In this embodiment, the gaming machine software is programmed to interpret the absence of the signal as an indication that the reel is in the four symbol position configuration based on an initial system setup and configuration wherein the position of the hole 516 is aligned with the corresponding hole in the light cup mounting bracket 512 to appropriately position light from light cup 510*b* to illuminate symbol position 14*d*, light from light cup 510*a* to illuminate symbol position 14*e*, light from light cup 510*c* to illuminate symbol position 14*f*, and light from light cup 510*d* to illuminate symbol position 14*g*.

When the light cups 510 are in the four symbol position configuration, the light cups illuminate the reel strip 506 such that single symbols are illuminated at specific portions of the display 14. For example, in the four symbol position configuration, as noted above, light cup 510*a* illuminates a symbol on the reel strip 506 at position 14*e* of display 14, light cup 510*b* illuminates a symbol on the reel strip 506 at position 14*d* of display 14, light cup 510*c* illuminates the reel strip 506 at position 14*f* of display 14, and light cup 510*d* illuminates a symbol on the reel strip 506 at position 14*g* of display 14.

Figure 7B:
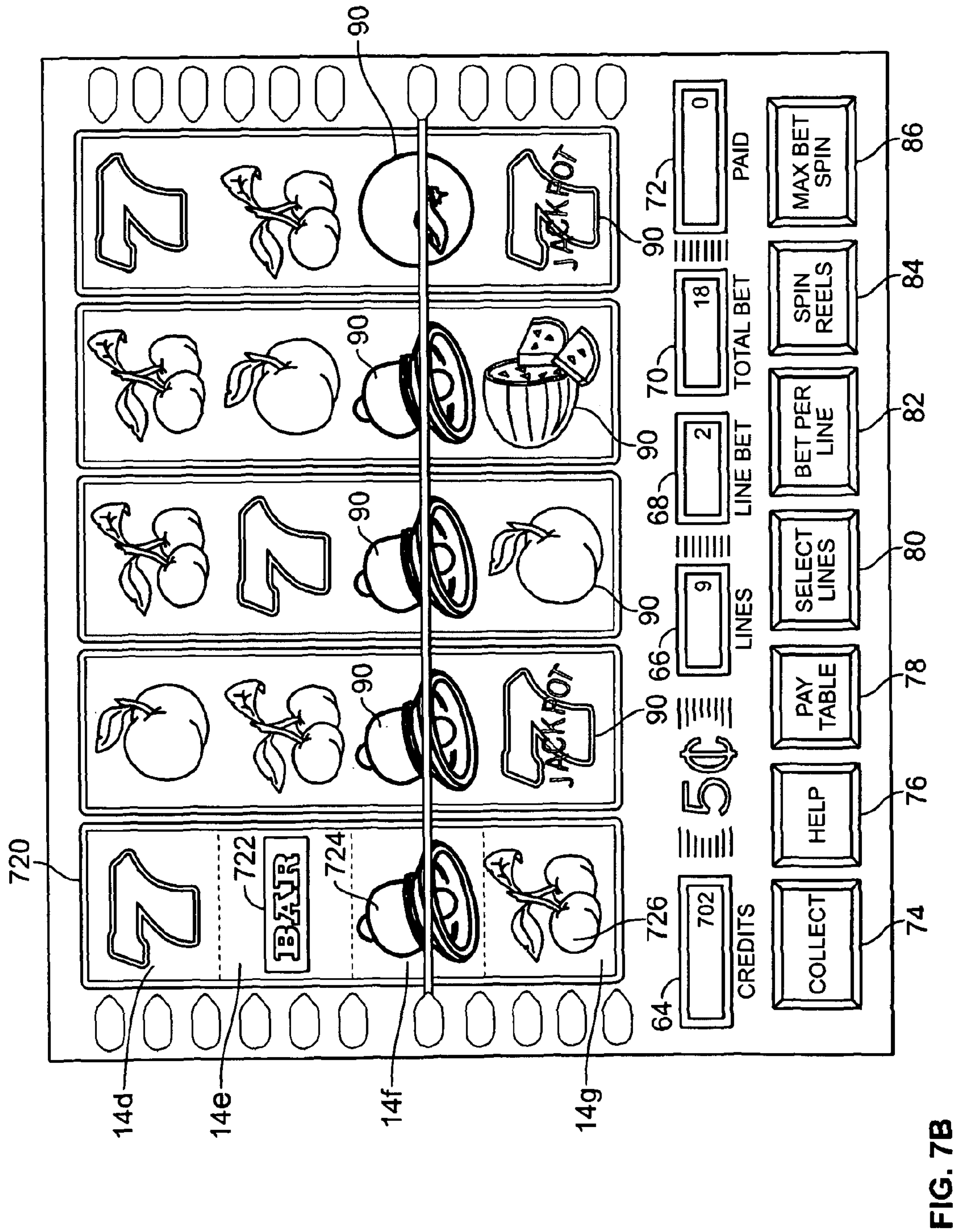
FIG. 7B is a depiction of a use of the light cups of FIG. 7A to selectively illuminate a winning payline in a winning game.

FIG. 7B illustrates the use of the light cups 510 to illuminate a reel strip 506. In this example, a "7" symbol 720 on the reel strip 506 is illuminated by light cup 510*b* and is visible at position 14*d* of the display; a "bar" symbol 722 is illuminated by light cup 510*a* and is visible at position 14*e* of the display; a "bell" symbol 724 is illuminated by light cup 510*c* and is visible at position 14*f* of the display; and a "cherry" symbol 726 is illuminated by light cup 510*d* and is visible at position 14*g* of the display Likewise, the present concepts may be extended to include larger sets of symbol combinations such as, but not limited to, a five symbol position reel configuration or combinations of different reel configurations (e.g., a 3-symbol position configuration adjacent a 4-symbol position configuration, etc.).

Figure 8:
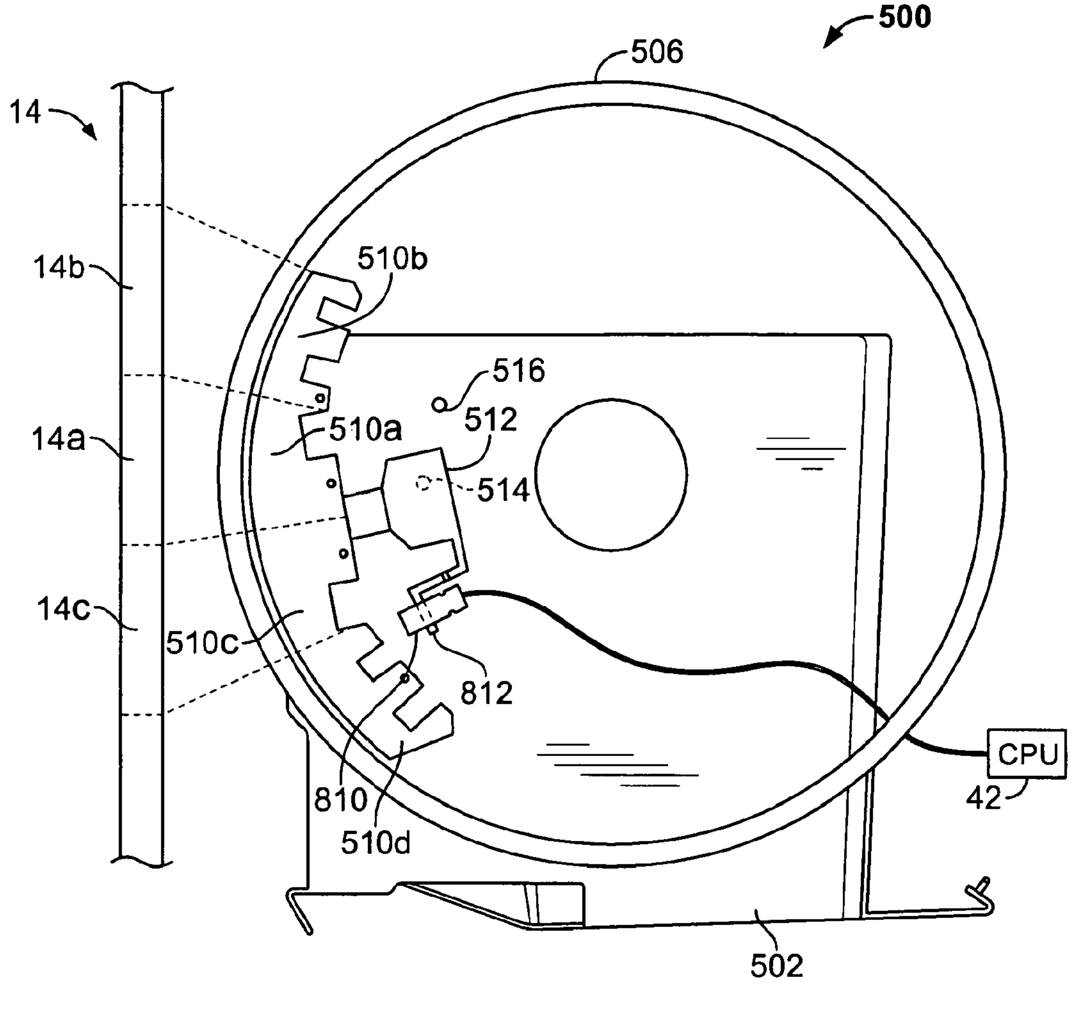
FIG. 8 is a side view (not to scale) of a reel mechanism, according to an embodiment of the present invention.

FIG. 8 shows a side view of the reel mechanism 500 of FIGS. 6A-7B in a three symbol position configuration (as described for FIGS. 6A-6B). In this example, light cup mounting bracket 512 is rotated into a first position wherein the screw hole of the light cup mounting bracket 512 (not shown) is aligned with the hole 514 of the reel support structure 502. A screw or other mechanical fastening device (not shown) is then used to fix the position of the light cup mounting bracket 512 relative to the reel support structure 502. In this embodiment, the position indicator is an optical interrupter sensor 810 coupled to the reel support structure 502. The optical interrupter sensor 810 is coupled to the CPU 42. Light cup mounting bracket 512 includes a flag 812 protruding out therefrom. When the flag 812 is positioned within the optical interrupter sensor 810, the flag 812 blocks the optical path of the sensor 810. The optical interrupter sensor 810 communicates a signal to the CPU 42 indicating that the optical path is blocked. The CPU 42 and/or other controller or firmware is programmed to interpret the signal to indicate that the reel mechanism 500 is in a three symbol position configuration, for example by comparing the signal to a value stored in a memory location. For example, the memory can store a value of "1" to represent a three symbol position configuration. The CPU 42 can be configured to interpret the signal from the sensor 810 as a "1". Thus, the CPU 42 can compare the "1" from the sensor 810 with the "1" stored in the memory location and determine that there is a match.

Figure 9:
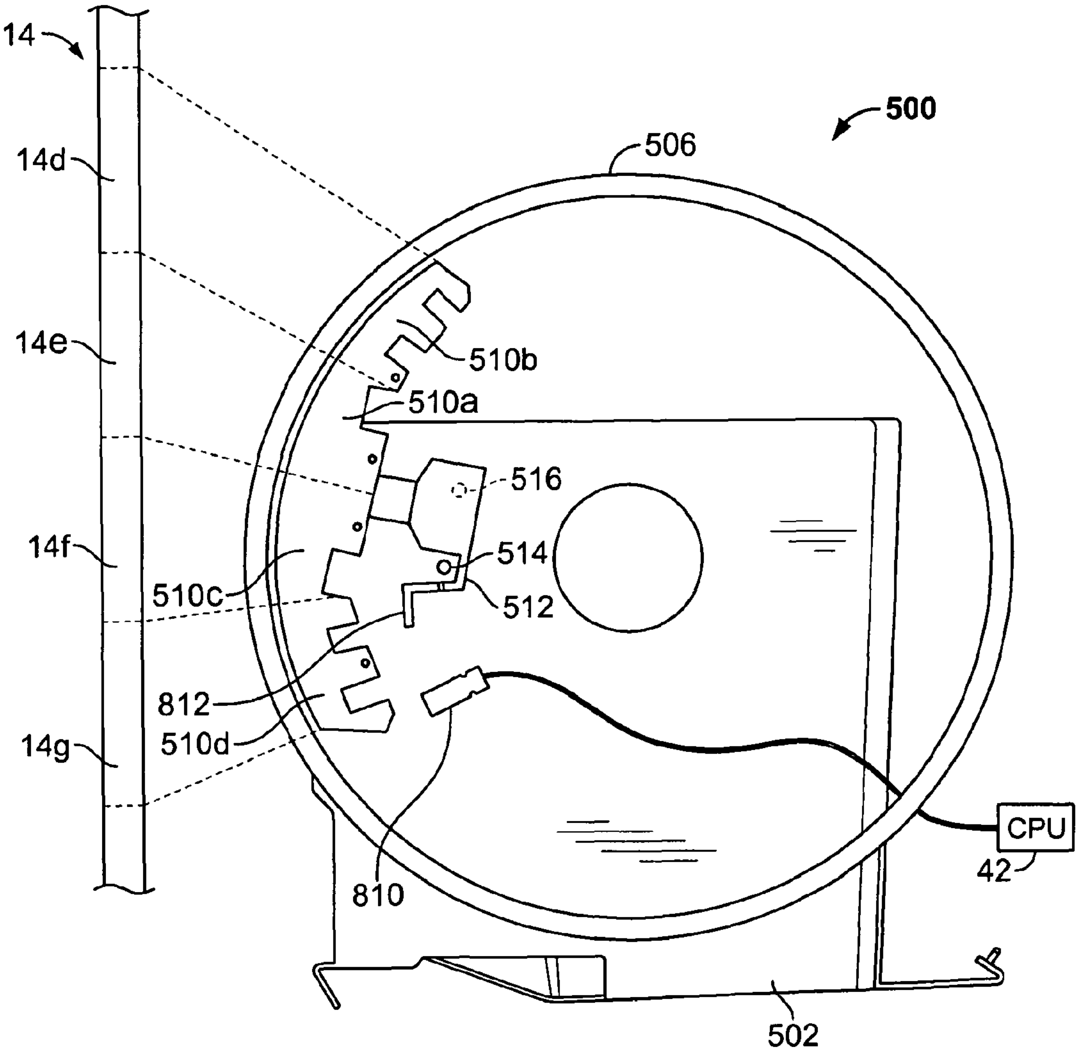
FIG. 9 is a side view (not to scale) of a reel mechanism, according to an embodiment of the present invention.

Referring now to FIG. 9, there is shown a side view of the reel mechanism 500 in a four symbol position configuration, with light cup mounting bracket 512 rotated to a second position and coupled to the reel support structure 502 using a mechanical fastening device (not shown) through hole 516 to fix the light cups mounting bracket 512 relative to the reel support structure 502. Here, the flag 812 is not positioned within the optical interrupter sensor 810, and the optical interrupter sensor 810 does not send a signal to the CPU 42. The CPU 42 can be configured to interpret the absence of the signal as an indication that the reel mechanism 500 is in a four symbol position configuration. The CPU 42 can be configured to interpret the lack of a signal from the sensor 810 as a "0". Thus, the CPU 42 can compare the "0" from the sensor 810 with the "1" stored in the memory location and determine that there is not a match. In an alternative configuration, the optical interrupter sensor 810 could be coupled to the light cup mounting bracket 512 and the flag 812 could be part of the reel support structure 502. In still additional configurations, other mechanisms could be used as position indicators including, but not limited to, reflective optical sensors, eddy sensors, reed switches, etcetera.

Figure 10:
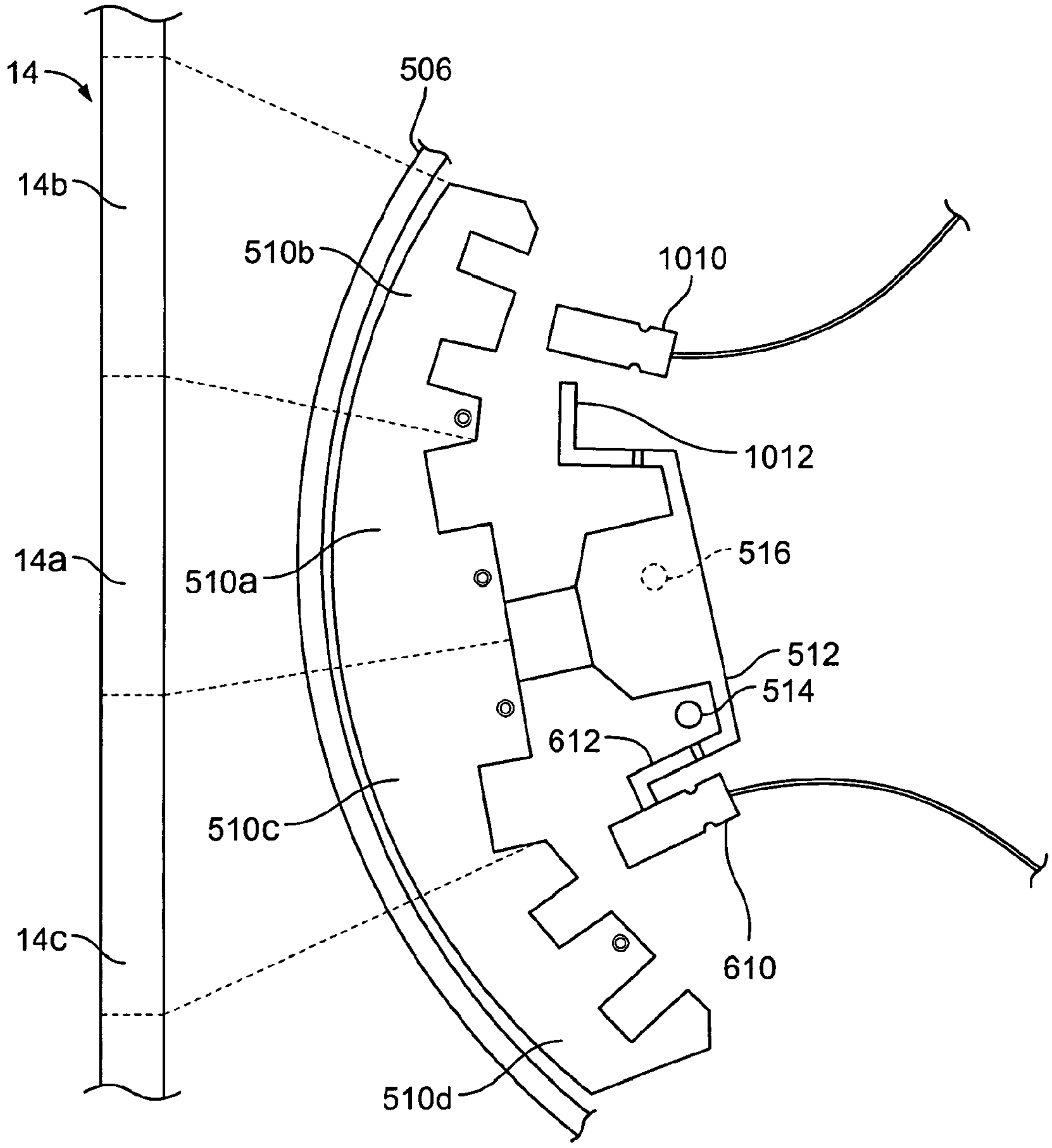
FIG. 10 is a side view (not to scale) of a reel mechanism, according to an embodiment of the present invention.
Figure 11:
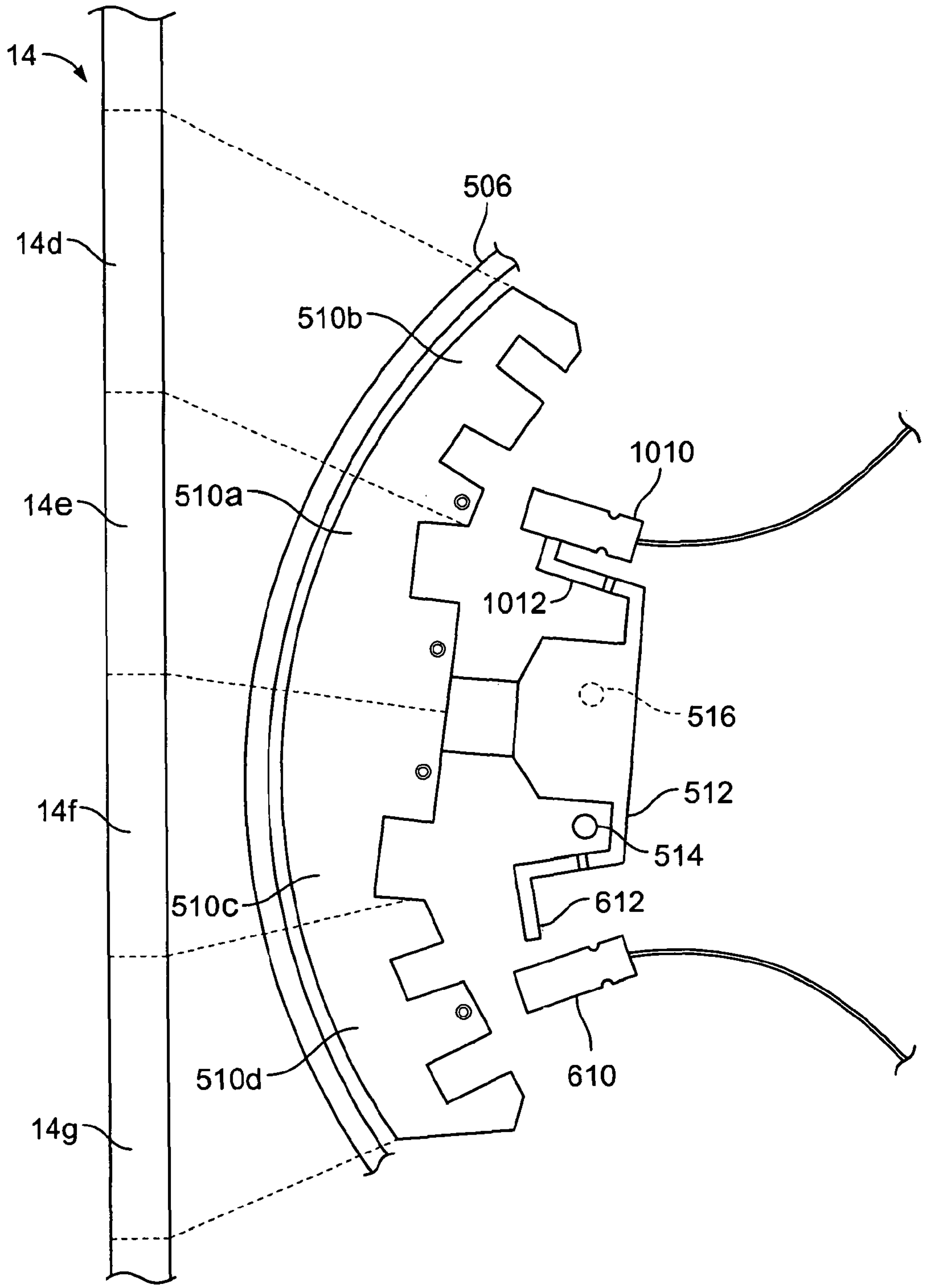
FIG. 11 is a side view (not to scale) of a reel mechanism, according to an embodiment of the present invention.

As shown in FIG. 10, a reel mechanism 500 can include more than one position indicator. For example, in the embodiment of FIG. 10, the light cup mounting bracket 512 could have two position indicators. For example, mounting bracket 512 may have flags 812 and 1012 and corresponding optical interrupter sensors 810, 1010 connected to the reel support structure 502 (not shown). The sensors 810, 1010 output signals to the CPU 42 when flags 812, 1012 are disposed within sensors 810, 1010, respectively. FIG. 10 shows the reel mechanism 500 in a three symbol configuration, wherein flag 812 interrupts sensor 810 and flag 1012 does not interrupt sensor 1010. FIG. 11 shows the reel mechanism 500 in a four symbol configuration, wherein flag 1012 interrupts sensor 1010 and flag 812 does not interrupt sensor 810. As described above, the position indicators could also include protrusions on the light cup mounting bracket engaging switches coupled to the reel support structure.

Thus, if more than one position indicator is used, the software can be used to determine uniquely which of two positions the light cups 510*a-d* are in. In other words, the software can determine that the reel is in a four symbol position configuration and not in a three symbol position configuration. If neither position indicator indicates a position, then the reel may be configured somewhere in between. For example, the software can compare the two signals from the two sensors 810, 1010 to information stored in memory locations (e.g., stored in a table) to determine the position of the light cups 510.

Moreover, if two position indicators are used, the CPU can be configured to determine which position among four possible positions the reel is in. In the case of two position sensors, there are three possible position indicator combinations (where the state of each position indicator is ON or OFF): ON/OFF, OFF/ON, OFF/OFF. For example, the CPU can be configured to compare the two signals from the two switch mechanisms to information stored in memory locations (e.g., stored in a table) to determine the position of the light cups.

Figure 12:
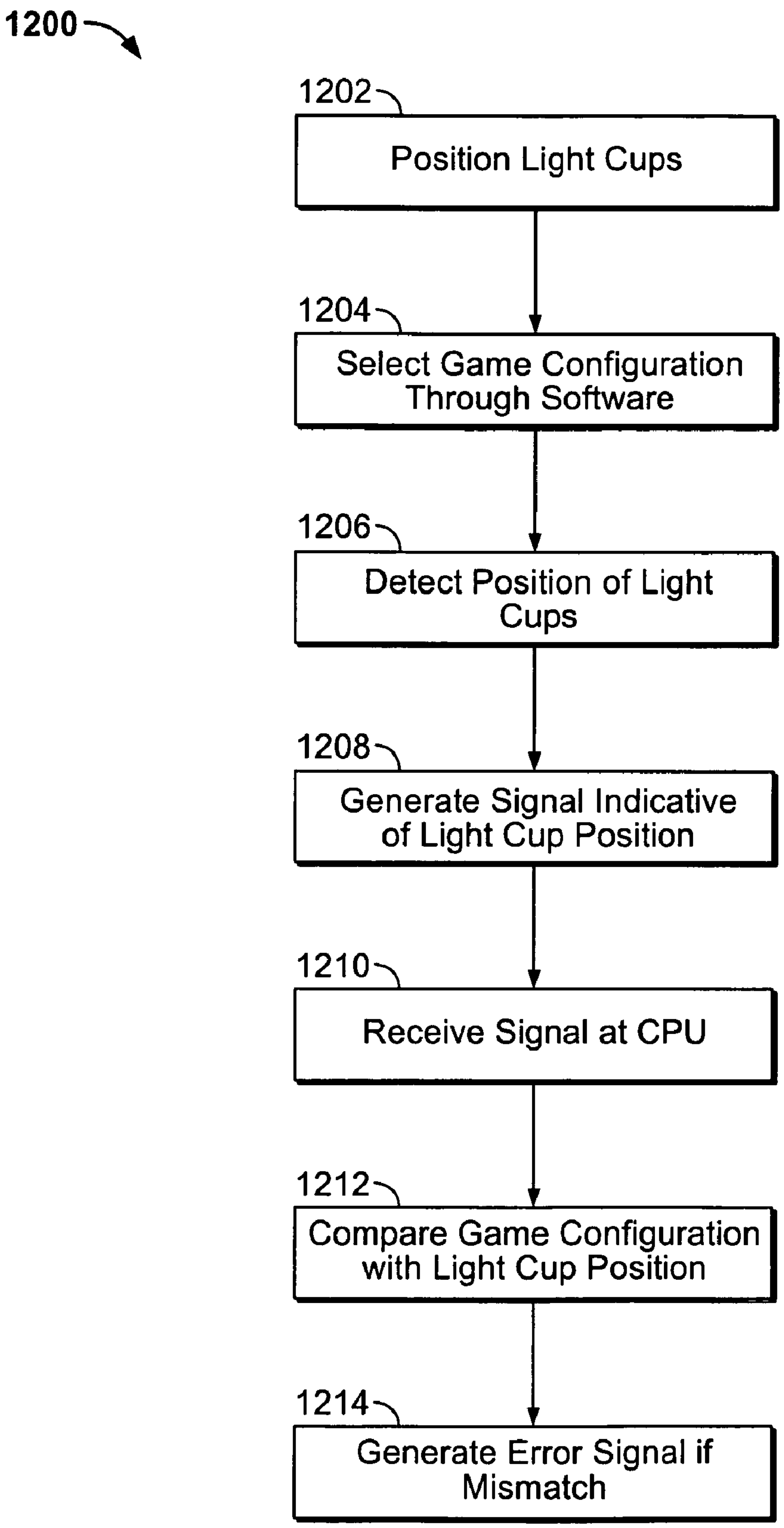
FIG. 12 is a flow chart of a method of configuring a gaming system.

FIG. 12 shows a method 1200 of configuring a gaming terminal. At the time the gaming terminal is set up and configured, a technician positions the light cups 510*a-d* in a desired configuration and locks them into place (1202), for example by positioning the light cup mounting bracket 512 and securing it to the reel support structure 502 with a mechanical fastening device through either hole 514 or 516. If a continuous slot is used rather than discrete holes, the technician can position the light cups by adjusting the mounting bracket 512 to an appropriate position and securing it to the reel support structure 502 with a mechanical fastening device and a corresponding fixing device (e.g., nut, pin, etc.) though the slot. The technician can align the light cups 510*a-d* to the reel strip 506, for example, by visual inspection to ensure that each light cup illuminates the correct reel position and only that reel position.

The technician also configures the software of the gaming terminal to run a specific game (1204), for example by choosing a set-up through a menu displayed on touch screen 38 of player-input device 26. The game run on the gaming terminal requires that the light cups 510*a-d* be configured for a proper number of symbol positions for each reel mechanism 500, such that the appropriate number of symbols per reel is displayed at the primary display area 14 for the game. If the light cups 510 are configured in a different configuration than the software is expecting, the game may not run properly. In preferred embodiments, the position indicator indicates to the CPU 42 the position the light cups 510 are actually in, for example using a sensor and flag to detect the position (1206) and generate a signal indicative of the position of the light cups (1208). The signal is received by the CPU 42 (1210), and, as described above, can be interpreted by the CPU 42 as information about the position of the light cups. The CPU 42 can compare the actual light cup position or light cup mounting bracket 512 position, or alternatively the absence of a signal corresponding to the proper light cup position or light cup mounting bracket 512 position, to the expected position for the game to be played (1212). For example, as described above, the CPU 42 can compare the signal representing the actual light cup position to information stored in a memory representing expected light cup position and generate a result if there is a match or mismatch. If the actual light cup position is different than the expected light cup position, the CPU 42 can indicate the mismatch, for example through an error signal, to the technician, who can then make a correction to either the software configuration or the light cup configuration (1214).

In another embodiment, the gaming machine can determine an appropriate game mode based on the actual configuration of the light cups. For example, the technician positions the light cups 510*a-d* in a desired configuration, fixes them into place (1202 above) into a specified predetermined position and turns on the gaming machine. The position indicator indicates to the CPU 42 the position the light cups 501*a-d* are actually in, as in 1206 and 1208 above. The signal is received by the CPU 42 (1210 above), and, as described above, can be interpreted by the CPU 42 as information about the position of the light cups. The CPU 42 can then select a game mode consistent with the position of the light cups, for example by comparing the information about the position of the light cups to entries in a lookup table.

In a preferred embodiment, the position indicator need only indicate the position to the CPU 42 during power up. This allows a position change to be sensed, for example, when the gaming terminal or software is upgraded, or when a game configuration is changed on the production line. The position can also be sensed periodically, at any selected period, or responsive to any selected event, to verify the position.

Figure 13:
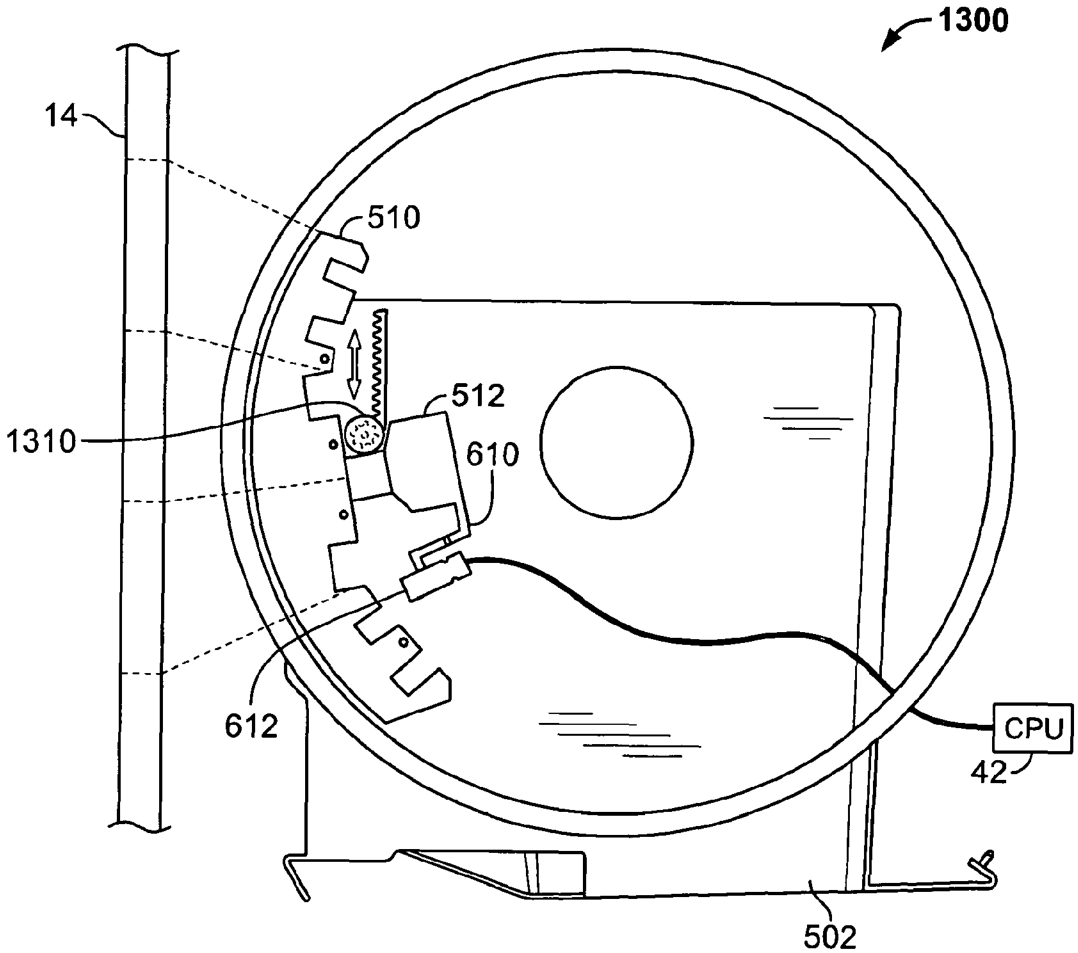
FIG. 13 is a side view of a reel mechanism, according to an embodiment of the present invention.

Referring now to FIG. 13, there is shown a reel mechanism 1300 based on the example of FIG. 6A through FIG. 7B, with a motor 1310 connected to the reel support structure 502 and the light cup mounting bracket 512 to change the position of the light cups 510, for example, by moving the light cups 510 up or down relative to the primary display area 14. The motor 1310 can be connected to the CPU 42, and the software can be used to instruct the motor 1310 to reposition the light cups 510, for example by changing the position of the light cup mounting bracket 512. A person of ordinary skill in the art will recognize that other mechanisms for repositioning the light cups can be used, for example, a solenoid, magnets, linear actuator, gears, etc. The position indicator on light cup mounting bracket 512 (here, the protrusion 610) and the corresponding switch 612 indicates the position to the CPU 42. Thus, the software can instruct the motor 1310 to change the position of the light cups 510, for example, from a four symbol position to a three symbol position, and the switch 612 will output a signal to the CPU 42 when the protrusion 610 presses the switch 612, indicating that the light cups 510 have been properly repositioned in the three symbol position (shown). The positions of the light cups 510*a-d* can be sensed periodically in this embodiment.

Figure 14:
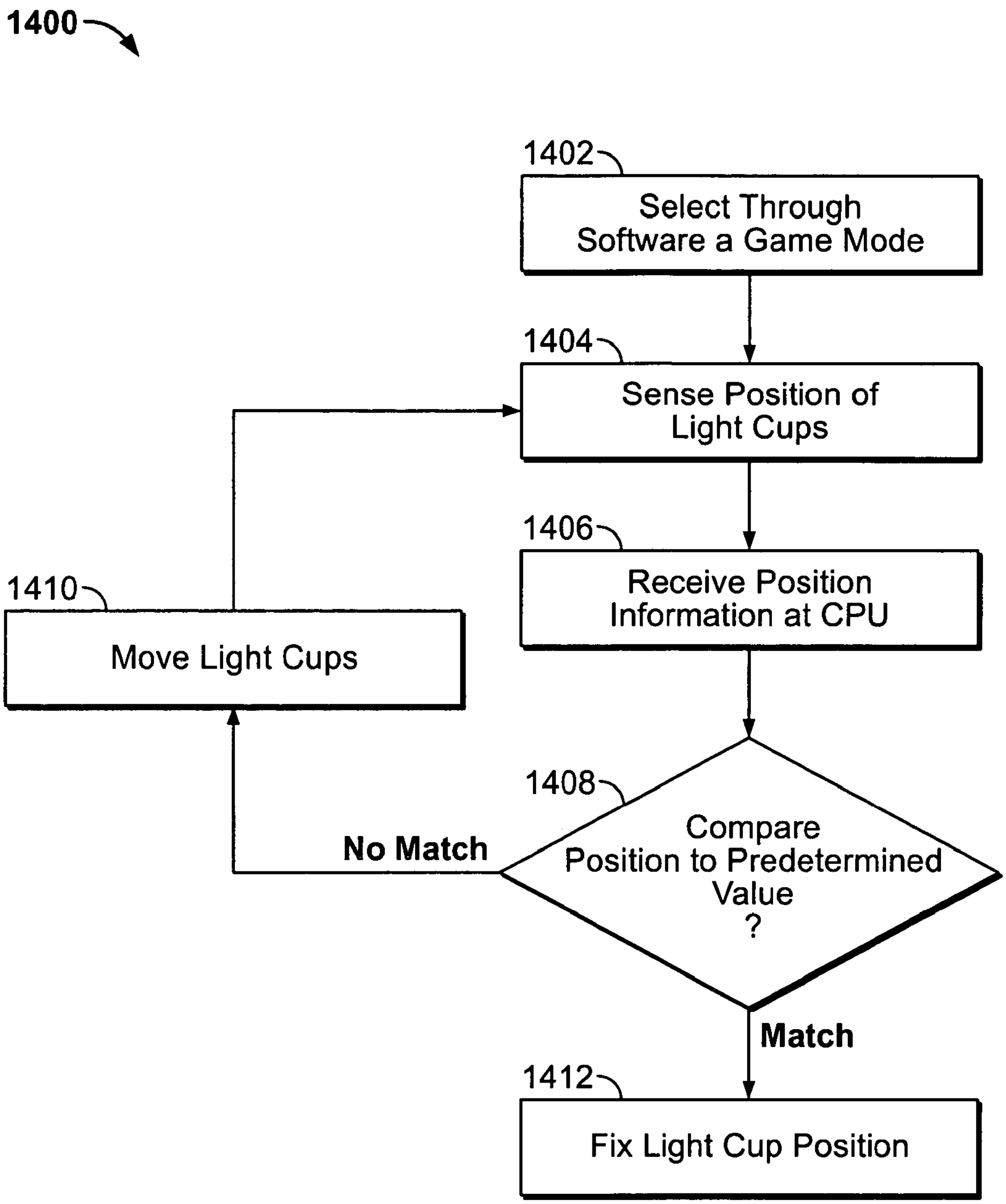
FIG. 14 is a flow chart of a method of configuring a gaming system.

FIG. 14 shows a method 1400 of repositioning the light cups. A game mode is selected through the software (1402). For example, a player may select a game that requires a change in configuration. As another example, the configuration may change within a game, for example changing from a four symbol position configuration during a base game to a three symbol position during a bonus game. The position of the light cups is sensed, as described above (1404), the position information is received by the CPU 42 (1406), and the position information is compared by the CPU 42 to a predetermined value (1408), for example by comparing the position information to a value stored in a memory. If the position information does not match the predetermined value, the CPU 42 instructs the motor 1310 to move the light cups (1410). Steps 1402 through 1410 are repeated until the position information matches the predetermined value. When the position information matches the predetermined value, the CPU 42 instructs the gaming machine to fix the position of the light cups (1412). To accomplish the change to the display, a variable display or a transmissive display may be used to appropriately reposition the graphics and art work such as, but not limited to, the pay lines which align to the center of the symbol positions. In a transmissive display, for example, the pay lines and game art work may be displayed on the transmissive display with the reels being positioned behind a transmissive window in the transmissive display, the transmissive window being configured to accommodate both a three and four symbol position configurations.

The light cups 510*a-d* can also be repositioned automatically between games or during a game, as instructed by the CPU 42. For example, during the base game, the reels may be positioned in three symbol position configuration, while during a bonus game the reels may be positioned in a four symbol position configuration.

In another embodiment, each reel mechanism can be reconfigured independently. For example, one reel mechanism may include light cups positioned in a three symbol position configuration while the rest of the reel mechanisms include light cups positioned in four symbol position configurations.

Figure 15A:
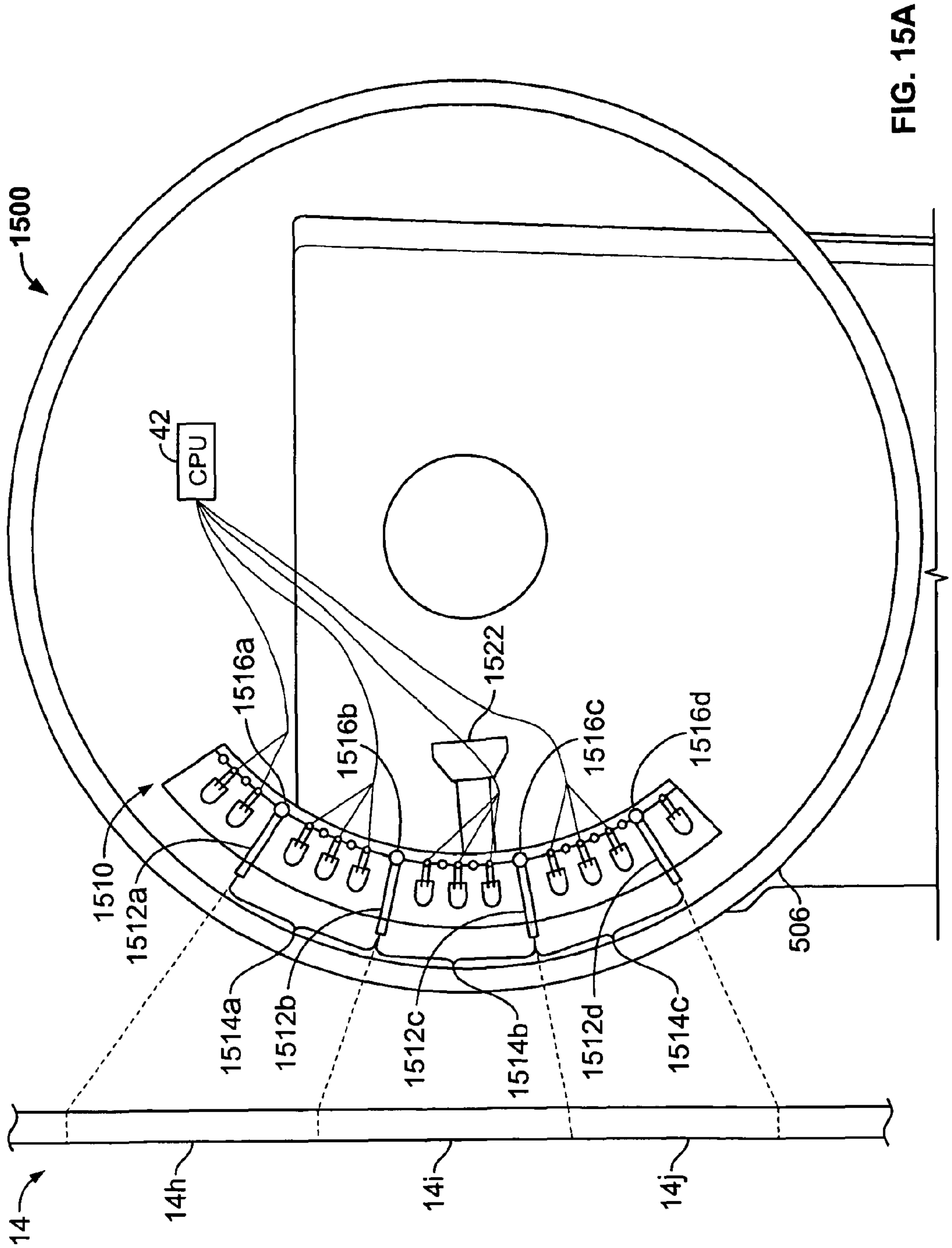
FIGS. 15A and 15B are side views (not to scale) of a reel mechanism, according to an embodiment of the present invention.
Figure 15B:
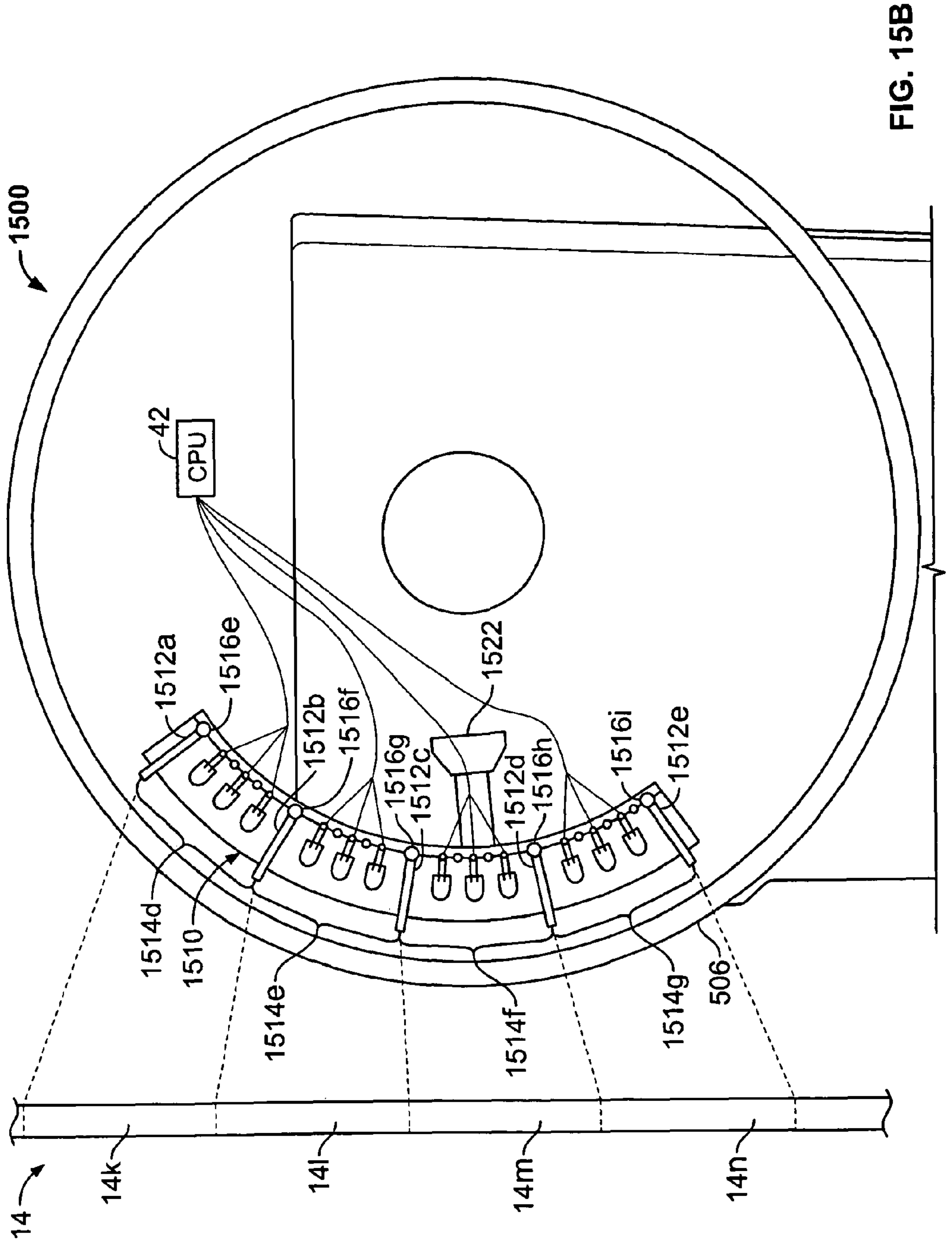

FIGS. 15A and 15B show yet another embodiment of the present invention. Reel 1500 includes an array of light sources 1510 (e.g., LEDs, OLEDs, light pipes, light bulbs, etc.), mounted in light box 1520, and secured to the reel support structure 502 with a light box mounting bracket 1522. The light sources 1510 are visible through primary display 14, and each is separately controlled by the CPU 42. Groups of light sources 1510 can be separated by movable partitions 1512*a-e*, which are removably mounted to the light box 1520. The movable partitions 1512*a-e* divide the groups of LEDs and, along with the walls of the light box, direct the light through corresponding portions 14*h*-14*n* of the display 14 as is represented in FIGS. 15A-15B, much as the light cups of previously described embodiments direct the light from the light sources. For example, to configure the gaming machine in a three symbol position configuration, as shown in FIG. 15A, movable partitions 1512*a-e* are positioned (for example, positioned manually by a technician) to divide light source groupings 1514*a-c* and direct the light from those groupings through corresponding portions 14*h*-14*j* of display 14. In this example, light grouping 1514*a* projects light through the reel strip 506 and through region 14*h* of display 14, light grouping 1514*b* projects light through the reel strip 506 and through region 14*i* of display 14, and light grouping 1514*c* projects light through the reel strip 506 and through region 14*j* of display 14. Each region 14*h-j* of display 14 represents a single symbol position. The movable partitions are optionally connected to one or more actuators controllable by the CPU 42 to permit the CPU to change the position of one or more movable partitions through actuation of the associated actuator or actuators. The position of the partitions 1512*a-d* can be sensed, for example, by DIP switches 1516*a-d*, respectively, which send partition position information to the CPU 42. The software can configure CPU 42 to individually control each of the light sources, and can cause the light sources to be turned on and off in whatever groupings are desired. For example, the software can configure CPU 42 to interpret the position of the partitions 1512*a-e* as a three symbol position configuration and illuminate the light sources in groupings 1514*a-c*, while turning off or reducing illumination of light sources not in these groupings.

As shown in FIG. 15B, the partitions can be configured to a four symbol position configuration, for example by positioning partitions 1512*a-e* (sensed by DIP switches 1516*e-i*) to divide light source groupings 1514*d-g* and direct the light from those groupings through display 14. In this example, light grouping 1514*d* projects light through the reel strip 506 and through region 14*k* of display 14, light grouping 1514*e* projects light through the reel strip 506 and through region 14*l* of display 14, light grouping 1514*f* projects light through the reel strip 506 and through region 14*m* of display 14, and light grouping 1514*g* projects light through the reel strip 506 and through region 14*n* of display 14. Each region 14*k-n* of display 14 represents a single symbol position. The position of the partitions 1512*a*-1512*e* can be sensed, for example, by DIP switches 1516*f-j*, respectively, which send partition position information to the CPU 42. The software can configure CPU 42 to interpret the position of the partitions 1512*a-e* as a four symbol position configuration and illuminate the light sources in groupings 1514*d-g*, while turning off light sources not in these groupings.

Figure 16:
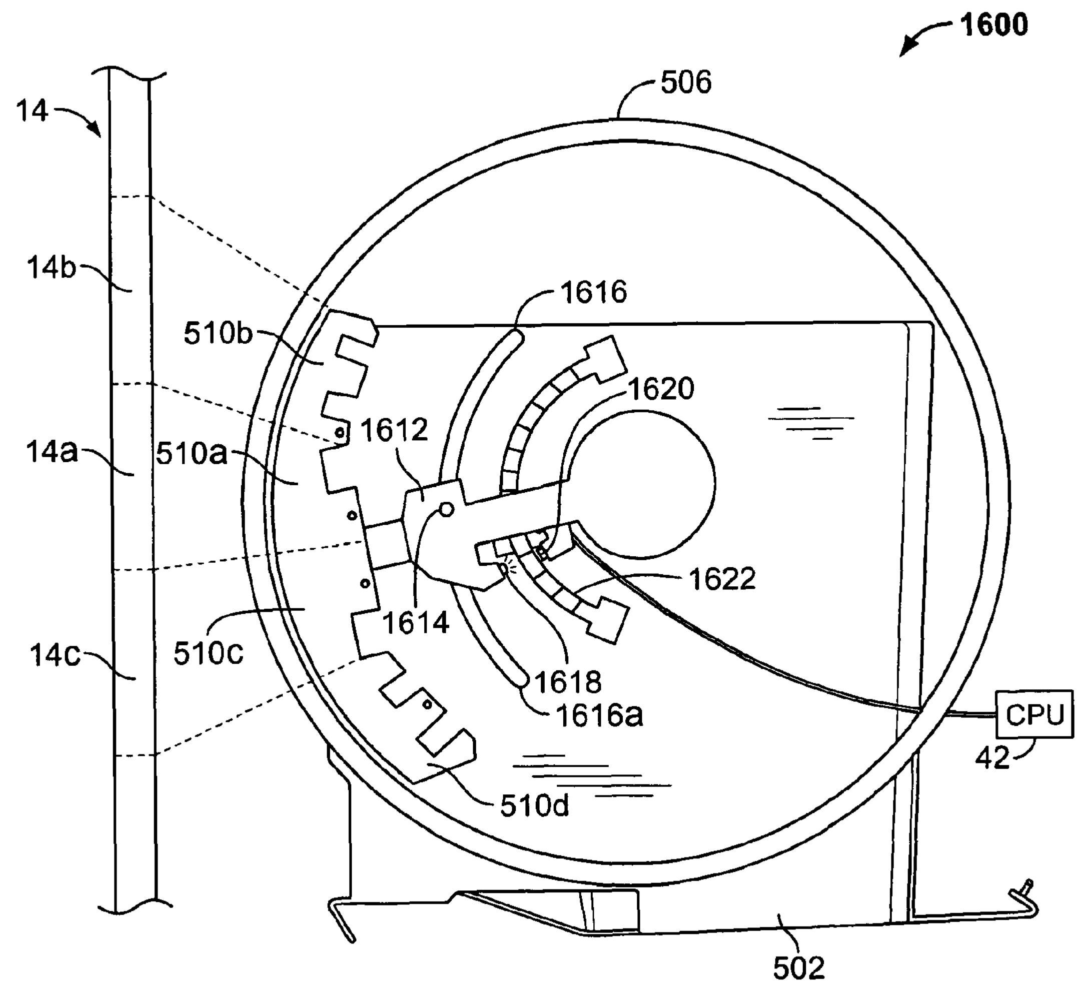
FIG. 16 is a side view (not to scale) of a reel mechanism, according to an embodiment of the present invention.

FIG. 16 shows another embodiment of the present invention. In reel 1600, the light cups 510 are mounted to the reel support structure 502 with mounting bracket 1612 using a mechanical fastener (e.g., bolt, pin, etc.) and corresponding fastening device (e.g., nut, pin, etc.) 1614 through continuous slot 1616. The light cups 510*a-d* can be rotated relative to the center of the reel. The mounting bracket 1612 also includes a light source 1618, such as an LED, and a sensor 1620 disposed opposite to light source 1618 to sense light from the light source 1618. The sensor is connected to the CPU 42. A grid or screen 1622 dividing the light source 1618 from the sensor 1620, fixed to the reel support structure 502 and stationary relative to the reel support structure 502. The grid 1622 includes a plurality of parallel bars separated by regular intervals. The bars of the grid 1622 occlude light from the light source 1618 at the regular intervals, such that when the mounting bracket 1612 is rotated, the light from the light source 1618 is alternately sensed and interrupted at the regular intervals.

The intervals can be used to determine the position of the light cups relative to a pre-configured home position. For example, as the mounting bracket 1612 is rotated upward from a home position (e.g., the bottom of the mechanical fastener 1614 is abutting a lower end 1616*a* of slot 1616), the sensor 1620 senses the alternate admission and interruption of light and outputs a signal to the CPU 42. Preferably the home position and actual position of the light cups are saved to a memory so that position information is not lost during a power interruption, power down, or power up of the gaming machine. The CPU 42 can then count the number of times light is sensed or interrupted since departing from the home position, and thus can determine the number of bars of grid 1622 that light source 1618 passed during rotation from or toward the home position. The CPU 42 can be configured to associate the number of bars counted with a symbol position configuration and during set-up, the number of bars of rotation of the mounting bracket 1612 can be mapped against the appropriate three symbol position configuration and four symbol position configuration. Once the CPU 42 indicates that the mounting bracket 1612 is in the correct configuration, such as the three symbol position configuration, the mounting bracket 1612 can then be secured in place to the reel support structure 502, such as by an actuator (not shown) brake or control input. If the light cups are being set manually during a powered-down condition wherein the sensor 1620 is deactivated, the technician can still verify visually that the light cups are in a pre-defined three symbol position or four symbol position relative to markings of such pre-defined three symbol position or four symbol position relative and to make adjustments to the light cups if necessary.

Properly positioned in the three symbol position configuration, the light cups illuminate the reel strip 506 such that single symbols are visible at specific portions of the display 14. For example, in the three symbol position configuration, light cup 510*a* illuminates a symbol on the reel strip 506 at position 14*a* of display 14, light cup 510*b* illuminates a symbol on the reel strip 506 at position 14*b* of display 14 and light cup 510*c* illuminates a symbol on the reel strip 506 at position 14*c* of display 14.

Each of these embodiments and obvious variations thereof is contemplated as falling within the spirit and scope of the claimed invention, which is set forth in the following claims. For example, one sensor could include, for example, a photosensitive transparent light sensor array disposed on backside of display 14 and mapped to the symbol positions 14A-14C, the photosensitive transparent light sensor array comprising photo TFTs to generate photocurrent in response to incident light with data lines indicating locations of the incident light on the photosensitive transparent light sensor array. If the light cups are being set automatically, the CPU 42 can then verify that the light cups illuminate symbols in the proper regions of the display 14 utilizing the output from a light sensor array disposed on backside of display 14 that is mapped to the plurality of available symbol positions 14*a*-14*j* and make corrections if necessary.

What is claimed is:

1. A gaming system comprising:

a display;

a reel mounted for rotation relative to the display, the reel comprising a reel strip having a plurality of display symbols thereon;

a plurality of light cups configured to illuminate the symbols on the reel strip that are displayed on the display;

a sensor configured to detect a position of the light cups relative to the display and to output position information, wherein the light cups are movable to a plurality of positions independently of the reel; and a controller configured to receive the position information from the sensor and to determine the position of the light cups relative to the reel from the position information.

2. The gaming system of claim 1, wherein the controller is configured to generate an error signal if the position information does not match a predetermined criteria.

3. The gaming system of claim 1, wherein the controller is further configured to receive an input signal corresponding to a game mode selection, the game mode selection including a position criteria and, responsive thereto, compare the position criteria to the position information and identify a match or mismatch between the position criteria and position information.

4. The gaming system of claim 1, wherein the sensor comprises a switch that is actuated when the light cups are positioned in a first symbol position.

5. The gaming system of claim 1, wherein the sensor comprises an optic sensor.

6. The gaming system of claim 1, further comprising:

a second sensor in communication with the controller to detect the position of the light cups relative to the display and generate a second position information; and wherein the controller is configured to receive the second position information from the second sensor and determine the position of the light cups relative to the reel from both the position information and the second position information.

7. A gaming system comprising:

a plurality of light cups associated with a rotating reel to illuminate symbols on the reel;

a sensor to detect the position of the plurality of light cups relative to a display;

an adjustment device connected to the plurality of light cups to adjust the position of the plurality of light cups relative to the display, wherein the plurality of light cups are movable to plurality of positions independently of the reel; and a controller configured to:

receive position information from the sensor, compare the position information to a predetermined position parameter, and control the adjustment device to adjust the position of the light cups until the position information at least substantially matches the predetermined position parameter.

8. The gaming system of claim 7, wherein the adjustment device comprises a motor.

9. The gaming system of claim 8, wherein the adjustment device comprises an actuator selected from the group consisting of a pneumatic actuator, electro-mechanical actuator, mechanical actuator, hydraulic cylinder, solenoid, linear actuator, or rotary actuator.

10. A method of configuring a wagering game on a gaming system, the method comprising:

detecting with a first sensor a position of a first plurality of light cups associated with a first rotatable reel, wherein the first plurality of light cups are movable to plurality of positions independently of the reel;

generating first position information at the first sensor indicative of the position of the first plurality of light cups;

receiving the first position information at a controller; and comparing the first position information to a first predetermined value; and generating a signal indicating that the first position information matches or mismatches the first predetermined value.

11. The method of claim 10, further comprising:

enabling a wagering game corresponding to the predetermined value if the first position information matches the first predetermined value.

12. The method of claim 10, further comprising generating an error signal if the first position information mismatches the first predetermined value.

13. The method of claim 10, further comprising:

detecting with a second sensor a position of a second plurality of light cups associated with a second reel;

generating second position information at the second sensor indicative of the position of the second plurality of light cups;

receiving the second position information at the controller;

comparing the second position information to a second predetermined value; and generating a signal indicating that the second position information matches or mismatches the second predetermined value.

14. The method of claim 13, further comprising:

generating an error signal if the first position information does not match the first predetermined value or the second position information does not match the second predetermined value.

15. The method of claim 13, wherein the first predetermined value corresponds to a first number of symbol positions and the second predetermined value corresponds to a second number of symbol positions.

16. The method of claim 15, wherein the first number of symbol positions is different than the second number of symbol positions.

17. A method of configuring a wagering game on a gaming system comprising at least one mechanical reel, the at least one mechanical reel being illuminated by a light cup, the method comprising:

providing a plurality of game mode options comprising a first game mode and a second game mode, the first game mode requiring a first light cup position for the light cup relative to a mechanical reel and the second game mode requiring a second light cup position for the light cup relative to a mechanical reel, the second position being different than the first position;

selecting one of the first game mode or the second game mode;

sensing the position of the light cup relative to the mechanical reel;

comparing the position of the light cup to the required position for the selected game mode; and moving the position of the light cup relative to the mechanical reel when the position of the light cup does not correspond to a selected game mode, the act of moving comprising moving the light cup from the first light cup position to the second light cup position when the second game mode is selected and moving the light cup from the second light cup position to the first light cup position when the first game mode is selected.

18. The method of claim 17, wherein the second game mode is a bonus game associated with the first game mode.

19. A gaming system comprising:

a plurality of light cups associated with a first rotatable reel, the reel including a plurality of symbols;

sensing means to determine position information of the plurality of light cups, wherein the plurality of light cups are movable to plurality of positions independently of the reel; and a controller in communication with the sensing means, the controller being configured to determine the position of the plurality of light cups from the position information.

20. The gaming system of claim 19, further comprising adjustment means for changing the position of the plurality of light cups relative to the display, wherein the controller is configured to control the adjustment means to change the position of the light cups until the position information from the sensing means indicates that the position of the plurality of light cups meets a predetermined criteria.

21. The gaming system of claim 19, wherein the controller is configured to compare the position information to a predetermined criteria and to determine if a mismatch exists between the position information and the predetermined criteria.

22. The gaming system of claim 19, further comprising:

second sensing means in communication with the controller for determining second position information of the plurality of light cups; and wherein the controller is configured to determine the position of the plurality of light cups from the position information and the second position information.

23. The gaming system of claim 22, wherein the controller is configured to uniquely determine the position of the plurality of light cups from the position information and the second position information.

24. The gaming system of claim 22, wherein the controller is configured to determine, from the position information and the second position information, whether the plurality of light cups is in a first symbol position or a second symbol position.

25. A gaming system comprising:

means for illuminating reel symbols displayed on a display using light sources;

sensor means for sensing a position of the light sources relative to the display and outputting a signal relating to the sensed position of the light sources, wherein the plurality of light sources are movable to plurality of positions independently of the reel;

and processing means for receiving the signal from the sensor means and for determining a position of the light sources relative to the display.

* * * * *